US012755858B2

(12) United States Patent
Song et al.

(10) Patent No.: US 12,755,858 B2

(45) Date of Patent: Oct. 6, 2026

(54) SYSTEMS AND METHODS FOR DRIVING LEAVES IN A MULTI-LEAF COLLIMATOR

(71) Applicant: SHANGHAI UNITED IMAGING HEALTHCARE CO., LTD., Shanghai (CN)

(72) Inventors: Bin Song, Shanghai (CN); Kun Yang, Shanghai (CN); Jian Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 261 days.

(21) Appl. No.: 18/586,409

(22) Filed: Feb. 23, 2024

(65) Prior Publication Data

US 2024/0194368 A1 Jun. 13, 2024

Related U.S. Application Data

(63) Continuation of application No. PCT/CN2021/114268, filed on Aug. 24, 2021.

(51) Int. Cl.
*G21K 1/04* (2006.01)

(52) U.S. Cl.
CPC .................................... *G21K 1/046* (2013.01)

(58) Field of Classification Search
CPC ................................. G21K 1/04; G21K 1/046
See application file for complete search history.

(56) References Cited

U.S. PATENT DOCUMENTS

| | | | |
|---|---|---|---|
| 8,384,049 | B1 | 2/2013 | Broad |
| 2009/0041199 | A1 | 2/2009 | Bohn |
| 2009/0262901 | A1 | 10/2009 | Broad et al. |
| 2014/0239204 | A1 | 8/2014 | Orton et al. |
| 2020/0023198 | A1 | 1/2020 | Zhang et al. |
| 2020/0185119 | A1 | 6/2020 | Stahl et al. |

FOREIGN PATENT DOCUMENTS

| | | | |
|---|---|---|---|
| CN | 101499326 | A | 8/2009 |
| CN | 105999567 | A | 10/2016 |

OTHER PUBLICATIONS

International Search Report in PCT/CN2021/114268 mailed on Apr. 26, 2022, 5 pages.
Written Opinion in PCT/CN2021/114268 mailed on Apr. 26, 2022, 4 pages.

*Primary Examiner* — Jurie Yun
(74) *Attorney, Agent, or Firm* — METIS IP LLC

(57) ABSTRACT

An MLC may include a plurality of leaves configured to shape a radiation field, and a plurality of driving assemblies each of which is configured to drive one of the plurality of leaves to a desired target position for shaping the radiation field. The driving assembly associated with a leaf may include a driving component configured to drive the leaf toward a desired first position with a speed exceeding a speed threshold; and a braking component configured to stop the leaf within a time period in response to a determination that the leaf arrives at the desired first position. In some embodiments, the time period of the braking component for stopping the leaf may be less than a time threshold.

20 Claims, 12 Drawing Sheets

200

100

SYSTEMS AND METHODS FOR DRIVING LEAVES IN A MULTI-LEAF COLLIMATOR

CROSS-REFERENCE TO RELATED APPLICATIONS

The application is a Continuation of International Application No. PCT/CN2021/114268, filed on Aug. 24, 2021, the contents of which are hereby incorporated by reference.

TECHNICAL FIELD

The present disclosure generally relates to a medical treatment system, and more specifically relates to methods and systems for driving and/or stopping a leaf in a multi-leaf collimator (MLC) in a radiotherapy procedure.

BACKGROUND

A multi-leaf collimator (MLC) is widely used for collimating radiation beams emitted from a radiation source in radiotherapy systems. The radiation beams collimated by an MLC may be projected to a tumor and an area formed by the projected radiation beams may comply with the shape of the tumor to prevent healthy tissues around the tumor from being radiated. In radiotherapy, each of leaves in an MLC needs to be moved to a position (also referred to as positioning of a leaf) accurately and quickly. The positioning accuracy and/or efficiency of the leaves in the MLC for forming a radiation field is important for precise and efficient radiotherapy. It is desirable to provide systems and methods for driving each of the leaves in the MLC to a position efficiently and accurately.

SUMMARY

According to an aspect of the present disclosure, a multi-leaf collimator (MLC) is provided. The MLC may include a plurality of leaves configured to shape a radiation field, and a plurality of driving assemblies each of which is configured to drive one of the plurality of leaves to a desired target position for shaping the radiation field. The driving assembly associated with a leaf may include a driving component configured to drive the leaf toward a desired first position with a speed exceeding a speed threshold; and a braking component configured to stop the leaf within a time period in response to a determination that the leaf arrives at the desired first position. In some embodiments, the time period of the braking component for stopping the leaf may be less than a time threshold.

In some embodiments, the speed threshold may exceed 100 millimeters per second.

In some embodiments, the speed threshold may exceed 200 millimeters per second.

In some embodiments, the time period of the braking component for stopping the leaf may be less than 1 millisecond.

In some embodiments, the braking component may be configured to stop the leaf at an actual first position, and a distance between the desired first position and the actual first position may be less than a distance threshold.

In some embodiments, the distance threshold may be less than 1 millimeter.

In some embodiments, the driving assembly may further include a position detection apparatus configured to acquire measurement data associated with an actual position of the leaf, and whether the leaf arrives at the desired first position may be determined based on the measurement data associated with the actual position of the leaf.

In some embodiments, the driving component may include a pneumatic actuator.

In some embodiments, the braking component may include one or more deformable parts, each of the one or more deformable parts including a piezoelectric material that is deformed under electricity.

In some embodiments, the braking component may include a piezoelectric actuator.

In some embodiments, the braking component may provide a first force on the leaf to stop the leaf after a direct current signal is inputted into the one or more deformable parts.

In some embodiments, the braking component may be further configured to drive the leaf to move by providing a second force on the leaf.

In some embodiments, the second force may be generated by the braking component after an alternating current is inputted into the one or more deformable parts.

In some embodiments, the driving assembly may further include a first transmission part connected the leaf and the driving component, a movement of the first transmission part driven by the driving component causing a movement of the leaf, and the braking component may be configured to stop the movement of the first transmission part to stop the movement of the leaf.

In some embodiments, the braking component may further include a second transmission part sleeved on the first transmission part, and the second transmission part may be configured to provide a force on the first transmission part to stop the movement of the first transmission part under the deformation of the one or more deformable parts.

In some embodiments, the one or more deformable parts may be connected in series along a direction parallel to the movement direction of the leaf.

In some embodiments, the desired first position may be the same as the desired target position or has a distance with the desired target position.

According to another aspect of the present disclosure, a method for driving one of a plurality of leaves in a multi-leaf collimator (MLC) to shape a radiation field is provided. The method may be implemented on a computing device having at least one processor and at least one computer-readable storage medium. Each of the plurality of leaves may be associated with a driving assembly configured to drive one of the plurality of leaves to a desired target position for shaping the radiation field. The method may include causing a driving component of the driving assembly to drive the leaf toward a desired first position with a speed exceeding a speed threshold; determining, based on measurement data associated with an actual position of the leaf acquired by a position detection apparatus, whether the leaf arrives at the desired first position; and causing a braking component of the driving assembly to stop the leaf within a time period in response to a determination that the leaf arrives at the desired first position, wherein the time period of the braking component for stopping the leaf is less than a time threshold.

According to another aspect of the present disclosure, a system for driving one of a plurality of leaves in a multi-leaf collimator (MLC) to shape a radiation field is provided. Each of the plurality of leaves may be associated with a driving assembly configured to drive one of the plurality of leaves to a desired target position for shaping the radiation field. The system may include a first control module configured to cause a driving component of the driving assembly to drive the leaf toward a desired first position; a position feedback module configured to determine, based on measurement data associated with an actual position of the leaf acquired by position detection apparatus, whether the leaf arrives at the desired first position; and a second control module configured to cause a braking component of the driving assembly to stop the leaf within a time period in response to a determination that the leaf arrives at the desired first position.

According to an aspect of the present disclosure, a multi-leaf collimator (MLC) is provided. The MLC may include a plurality of leaves configured to shape a radiation field, and a plurality of driving assemblies each of which is configured to drive one of the plurality of leaves to a desired target position for shaping the radiation field. The driving assembly associated with a leaf may include a pneumatic actuator configured to drive the leaf toward a desired first position; and a piezoelectric actuator configured to stop the leaf in response to a determination that the leaf arrives at the desired first position.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections, or assembly of different level in ascending order. However, the terms may be displaced by another expression if they achieve the same purpose.

Figure 7:
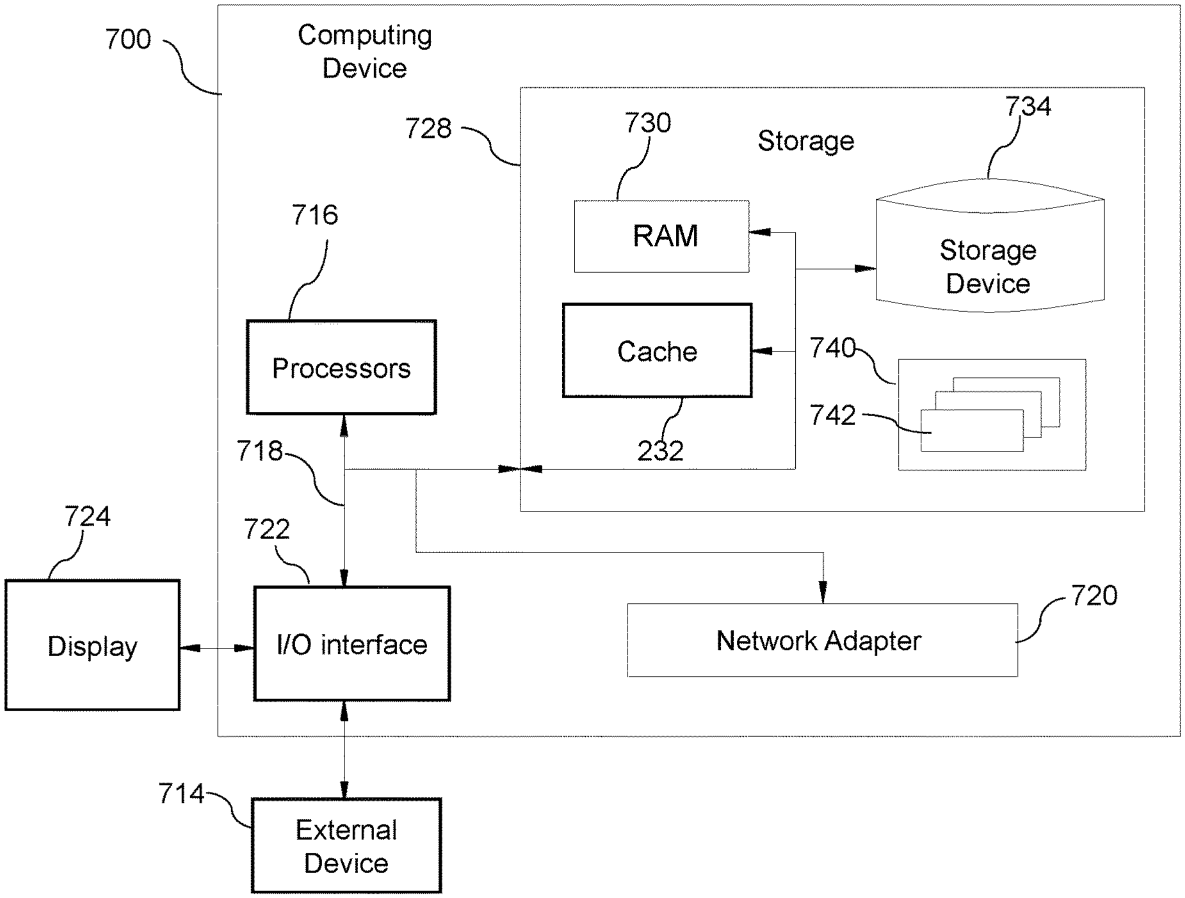
FIG. 7 is a schematic diagram illustrating exemplary hardware and/or software components of an exemplary computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices (e.g., processor 716 as illustrated in FIG. 7) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Provided herein are systems and components for medical diagnostic and/or treatment. In some embodiments, the diagnostic and treatment system may include a radiotherapy system. The radiotherapy system may include a treatment plan system (TPS), an image-guided radiotherapy (IGRT) system, etc. Merely by way of example, the image-guided radiotherapy (IGRT) system may include, for example, a CT guided radiotherapy system, an MRI guided radiotherapy system, etc.

The present disclosure relates to a multi-leaf collimator (MLC), a system and, a method for driving one of a plurality of leaves in the multi-leaf collimator (MLC) to a desired target position. The plurality of leaves may be configured to shape or scale a radiation field. Each of the plurality of leaves may be associated with a driving assembly configured to drive the leaf to the desired target position for shaping the radiation field. A driving component of the driving assembly may be caused by the system (e.g., a controller, a processor) to drive the leaf toward a desired first position. The system (e.g., a controller, a processor) may determine, based on measurement data associated with an actual position of the leaf acquired by position detection apparatus, whether the leaf arrives at the desired first position. Further, a braking component of the driving assembly may be caused by the system (e.g., a controller, a processor) to stop the leaf at an actual first position by providing a first force on the leaf within a time period in response to a determination that the leaf arrives at the desired first position. A distance between the desired first position and the actual first position may be less than a distance threshold (e.g., 1 millimeter, 0.5 millimeters, 0.3 millimeters, 100 micros, 50 microns, 30 microns, 10 microns, 5 microns, 2 microns, 1 micron, etc.). In some embodiments, the desired first position and the actual first position may be the same, i.e., the distance between the desired first position and the actual first position may be equal to zero. In some embodiments, the actual first position may be close to the desired first position, e.g., the distance between the desired first position and the actual first position may be 1 millimeter, 0.5 millimeters, 0.3 millimeters, 100 micros, 50 microns, etc. According to some embodiments of the present disclosure, the driving component may drive the leaf to move at a high speed, e.g., exceeding 100 millimeters per second, or exceeding 200 millimeters per second thereby the leaf may be driven to the desired first position quickly. The braking component may have a response time (i.e., the time period) for stopping the leaf less than a time threshold (e.g., 1 millisecond, 0.5 milliseconds, 0.3 milliseconds, 0.2 milliseconds, 0.1 milliseconds, etc.). Thus, the braking component may stop the leaf rapidly when the leaf is moving at a high speed in response to receiving a braking signal for stopping the leaf at the desired first position, such that the actual first position is close to or the same as the desired first position, thereby improving the positioning accuracy. Therefore, each of the plurality of leaves in the MLC may be driven efficiently and accurately, thereby improving the accuracy of the radiation field and the efficiency for shaping the radiation field, reducing the time for the treatment and the difficulty (e.g., efficiently and accurately positioning the leaves in the MLC for forming to radiation field) in radiotherapy.

In some embodiments, the desired first position may be the same as the desired target position, and the leaf may be driven to the desired target position by the driving component only once, thereby improving the positioning efficiency of the leaf.

In some embodiments, the desired first position may be the same as the desired target position, but the actual first position may be different from the desired target position, and the leaf may be driven to the desired target position by the braking component. The braking component may drive the leaf to move at a lower speed relative to the driving component, thereby improving the positioning efficiency and accuracy of the leaf.

In some embodiments, the desired first position may be different from the desired target position, the leaf may be driven to the desired first position by the driving component and driven to the desired target position by the braking component, thereby improving the positioning efficiency and accuracy of the leaf.

It should be noted that the radiotherapy system 100 described below is merely provided for illustration purposes, and not intended to limit the scope of the present disclosure. For persons having ordinary skills in the art, a certain amount of variations, changes, and/or modifications may be deducted under the guidance of the present disclosure. Those variations, changes, and/or modifications do not depart from the scope of the present disclosure.

Figure 1:
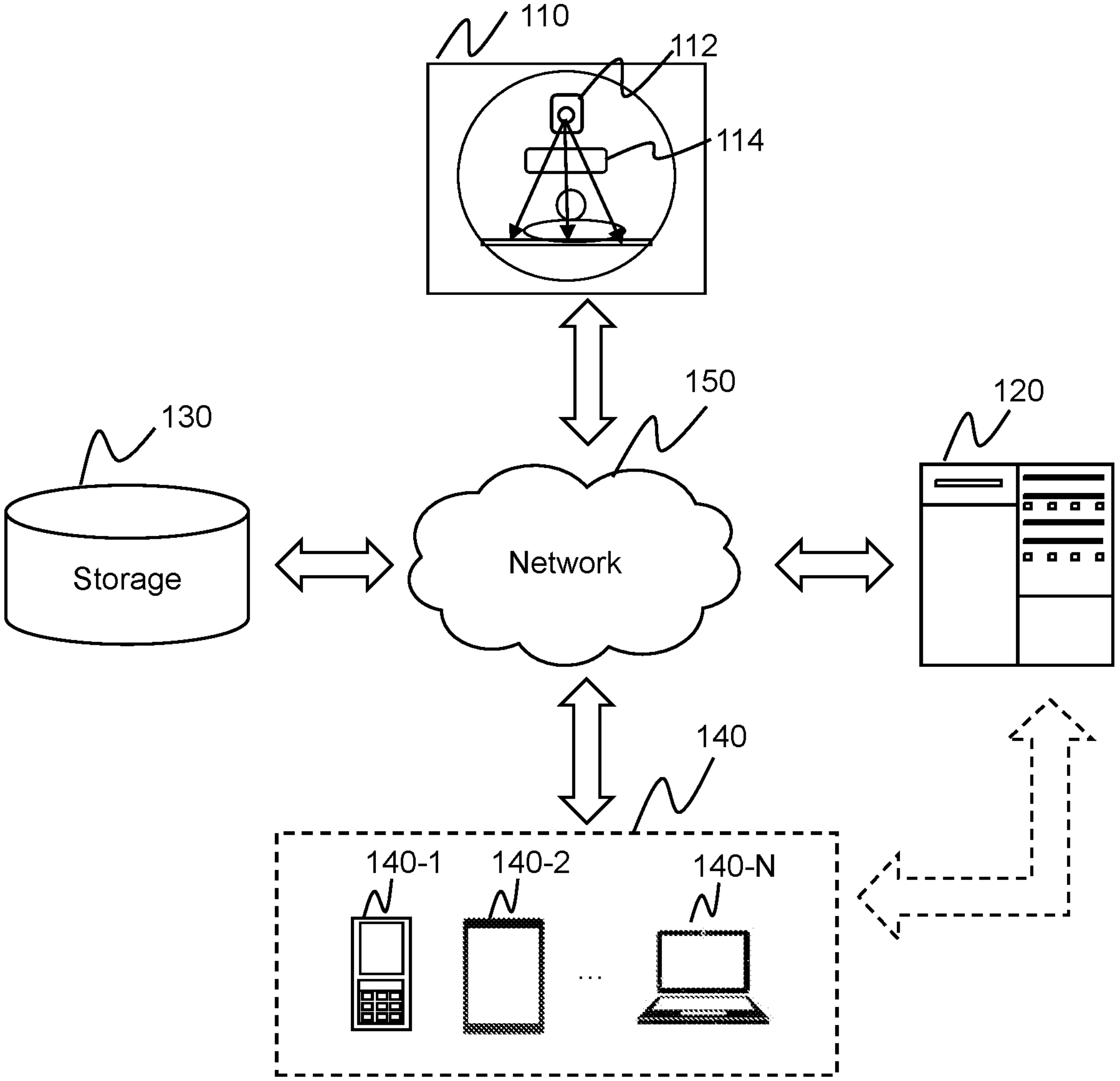
FIG. 1 is a schematic diagram illustrating an exemplary radiotherapy system according to some embodiments of the present disclosure.

FIG. 1 is a schematic diagram illustrating an exemplary radiotherapy system 100 according to some embodiments of the present disclosure. As shown, the radiotherapy system 100 may include a radiotherapy device 110, a processing device 120, a storage device 130, one or more terminal(s) 140, and a network 150. In some embodiments, the radiotherapy device 110, the processing device 120, the storage device 130, and/or the terminal(s) 140 may be connected to and/or communicate with each other via a wireless connection (e.g., the network 150), a wired connection, or a combination thereof. The connections between the components in the radiotherapy system 100 may vary. Merely by way of example, the radiotherapy device 110 may be connected to the processing device 120 through the network 150, as illustrated in FIG. 1. As another example, the radiotherapy device 110 may be connected to the processing device 120 directly. As a further example, the storage device 130 may be connected to the processing device 120 through the network 150, as illustrated in FIG. 1, or connected to the processing device 120 directly. As still a further example, the terminal(s) 140 may be connected to the processing device 120 through the network 150, as illustrated in FIG. 1, or connected to the processing device 120 directly (as indicated by the bidirectional arrow in the dashed line shown in FIG. 1), or connected to the radiotherapy device 110 directly or through the network 150. The terminal(s) 140 may be omitted.

The radiotherapy device 110 may perform radiotherapy treatment on at least one part of a subject. In some embodiments, the radiotherapy device 110 may include a single modality apparatus, for example, an X-ray therapy apparatus, a Co-60 teletherapy apparatus, a medical electron accelerator, etc. In some embodiments, the radiotherapy device 110 may be a multi-modality (e.g., two-modality) apparatus to acquire a medical image relating to the at least one part of the subject and perform radiotherapy treatment on the at least one part of the subject. The subject may be biological or non-biological. For example, the subject may include a patient, a man-made object, etc. As another example, the subject may include a specific portion, organ, and/or tissue of the patient. For example, the subject may include head, neck, thorax, cardiac, stomach, blood vessel, soft tissue, tumor, nodules, or the like, or a combination thereof. In some embodiments, the subject may include a region of interest (ROI), such as a tumor, a node, etc.

In some embodiments, the radiotherapy device 110 may include a gantry to which a treatment head may be connected. The treatment head may include a radiation source 112 and a multi-leaf collimator (MLC) 114. The radiation source 112 may emit radiation beams to a subject. The MLC 114 may be configured to collimate radiation beams emitted from the radiation source 112. In some embodiments, the MLC 114 may include a plurality of leaves to shape a radiation field. Each of the plurality of leaves may be associated with a driving assembly configured to drive one of the plurality of leaves to a desired target position for shaping the radiation field. A driving assembly associated with a leaf may include a driving component and a braking component. The driving component may be configured to drive the leaf toward a desired first position with a speed exceeding a speed threshold. The braking component may be configured to stop the leaf at an actual first position by providing a first force on the leaf within a time period in response to a determination that the leaf arrives at the desired first position. A distance between the desired first position and the actual first position may be less than a distance threshold. In some embodiments, the driving assembly may include position detection apparatus configured to acquire measurement data associated with an actual position of the leaf. More descriptions of the MLC 114 may be found elsewhere in the present disclosure (e.g., FIGS. 2-6 and the descriptions thereof).

The processing device 120 may process data and/or information obtained from the radiotherapy device 110, the storage device 130, and/or the terminal(s) 140. For example, the processing device 120 may cause a driving component of a driving assembly to drive a leaf in the MLC 114 toward a desired first position. As another example, the processing device 120 may determine, based on measurement data associated with an actual position of the leaf acquired by position detection apparatus, whether the leaf arrives at the desired first position. As a further example, the processing device 120 may cause a braking component of the driving assembly to stop the leaf at an actual first position by providing a first force on the leaf within a time period in response to a determination that the leaf arrives at the desired first position. As still another example, the processing device 120 may cause the braking component to drive the leaf toward a desired target position from the actual first position with a second speed by providing a second force on the leaf.

In some embodiments, the processing device 120 may be a single server or a server group. The server group may be centralized or distributed. In some embodiments, the processing device 120 may be local or remote. For example, the processing device 120 may access information and/or data from the radiotherapy device 110, the storage device 130, and/or the terminal(s) 140 via the network 150. As another example, the processing device 120 may be directly connected to the radiotherapy device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a mobile device having one or more components as described in connection with FIG. 4A.

The storage device 130 may store data, instructions, and/or any other information. In some embodiments, the storage device 130 may store data obtained from the radiotherapy device 110, the processing device 120, and/or the terminal(s) 140. In some embodiments, the storage device 130 may store data and/or instructions that the processing device 120 may execute or use to perform exemplary methods described in the present disclosure. In some embodiments, the storage device 130 may include a mass storage, removable storage, a volatile read-and-write memory, a read-only memory (ROM), or the like, or any combination thereof. In some embodiments, the storage device 130 may be implemented on a cloud platform as described elsewhere in the disclosure.

In some embodiments, the storage device 130 may be connected to the network 150 to communicate with one or more other components in the radiotherapy system 100 (e.g., the processing device 120, the terminal(s) 140, etc.). One or more components in the radiotherapy system 100 may access the data or instructions stored in the storage device 130 via the network 150. In some embodiments, the storage device 130 may be part of the processing device 120.

The terminal(s) 140 may be connected to and/or communicate with the radiotherapy device 110, the processing device 120, and/or the storage device 130. For example, the terminal(s) 140 may obtain a radiation field from the processing device 120. As another example, the terminal(s) 140 may obtain image data acquired via the radiotherapy device 110 and transmit the image data to the processing device 120 to be processed. In some embodiments, the terminal(s) 140 may include a mobile device 140-1, a tablet computer 140-2, . . . , a laptop computer 140-N, or the like, or any combination thereof. For example, the mobile device 140-1 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120.

The network 150 may include any suitable network that can facilitate the exchange of information and/or data for the radiotherapy system 100. In some embodiments, one or more components of the radiotherapy system 100 (e.g., the radiotherapy device 110, the processing device 120, the storage device 130, the terminal(s) 140, etc.) may communicate information and/or data with one or more other components of the radiotherapy system 100 via the network 150. For example, the processing device 120 may obtain image data from the radiotherapy device 110 via the network 150. As another example, the processing device 120 may obtain user instruction(s) from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, switches, server computers, and/or any combination thereof. For example, the network 150 may include wired and/or wireless network access points such as base stations and/or internet exchange points through which one or more components of the radiotherapy system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 130 may be a data storage including cloud computing platforms, such as public cloud, private cloud, community, and hybrid clouds, etc. As another example, the radiotherapy system 100 may further include a treatment planning system. However, those variations and modifications do not depart the scope of the present disclosure.

Figure 2:
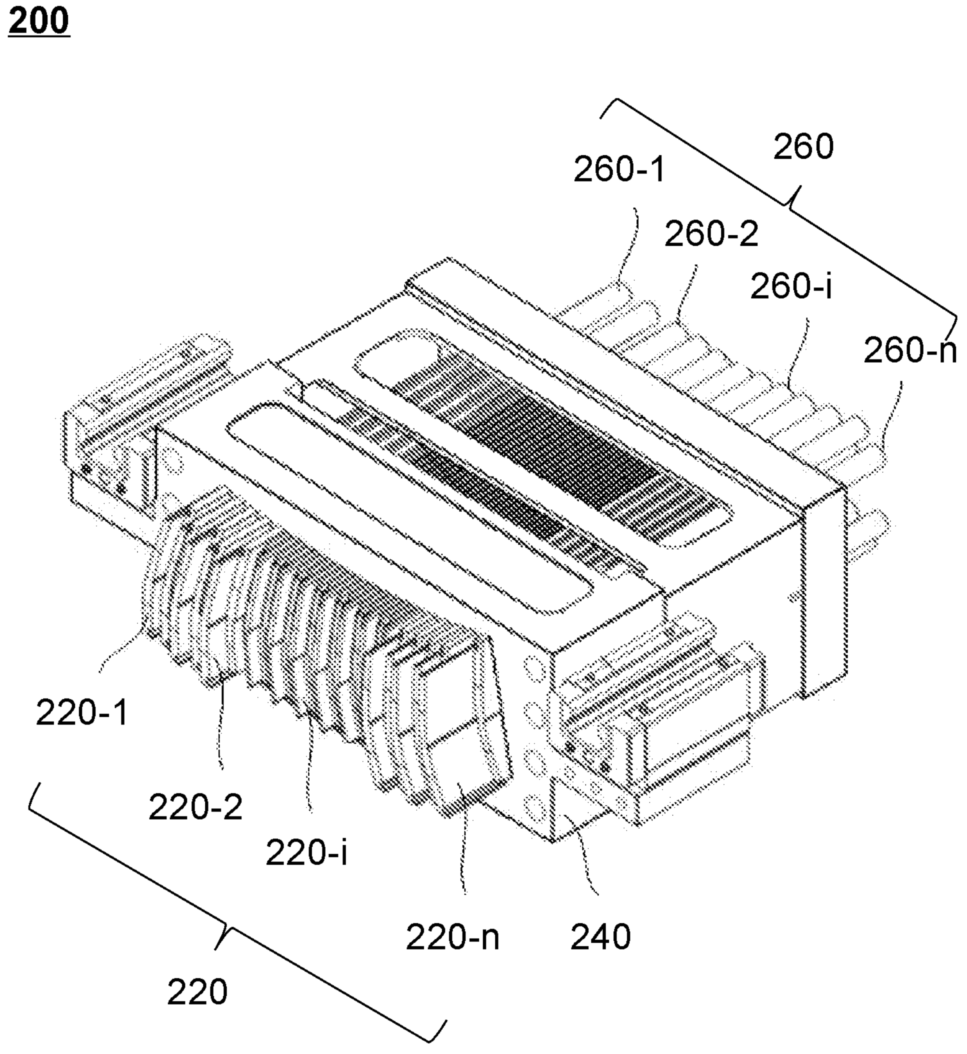
FIG. 2 is a schematic diagram illustrating an exemplary multi-leaf collimator (MLC) according to some embodiments of the present disclosure.

FIG. 2 is a schematic diagram illustrating an exemplary multi-leaf collimator (MLC) 200 according to some embodiments of the present disclosure.

As shown in FIG. 2, the MLC 200 may include a leaf assembly 220, a carriage 240, and a plurality of driving assemblies 260 (e.g., a driving assembly 260-1, a driving assembly 260-2, a driving assembly 260-*i*, . . . , a driving assembly 260-*n*, etc.).

The leaf assembly 220 may include a plurality of leaves (e.g., a leaf 220-1, a leaf 220-2, a leaf 220-*i*, . . . , a leaf 220-*n*, etc.), for example, 12, 15, 16, 24, 25, 31, 32, 36, 48, 50, 64, 72, 75, 100, 101,120, 128, 135, etc. Merely by way of example, the MLC 200 may include 64 leaves. In some embodiments, each leaf in the leaf assembly 220 may have a width of about 1 millimeter to about 10 millimeters (e.g., about 2 millimeters). In some embodiments, the size and shape of one of the leaf assembly 220 may be at least partially determined by the geometry of a gantry, the width of the radiation beam, a distance to the radiation source (or a distance from the MLC 200 to a target subject), the target MLC penumbra, and/or the desired "resolution" at which radiation is to be applied (e.g., leaf width, number (or count) of leaves). Each of the plurality of leaves may move in the carriage 240 independently, for example, move toward the center of a radiation field or move away from the center of the radiation field. The center of the radiation field may be a geometric center of the radiation field formed by the plurality of leaves. The radiation field may be projected to an ROI of a subject (e.g., tumor) and an area formed by the projected radiation field may comply with the shape of the ROI (i.e., a treatment region) of a subject (e.g., tumor) to prevent healthy tissues around the ROI from being radiated. The area formed by the projected radiation field may have a geometric center that also is referred to as an isocenter of the plurality of leaves.

The leaf assembly 220 may be configured to shield a portion of radiation beams and shape the radiation field. In some embodiments, the processing device 120 may control at least one leaf in the leaf assembly 220 of the MLC 200 to move into one or more desired target positions to collimate a shape of the radiation field, such that the area formed by the projected radiation field may comply with the shape of the ROI of a subject (e.g., tumor) to prevent healthy tissues around the ROI from being radiated. In some embodiments, the processing device 120 may control at least one leaf in the leaf assembly 220 to move into one or more positions to modify the shape of the radiation field according to one or more parameters associated with the MLC 200 (e.g., a segment shape defined by the shape of the radiation field formed by the MLC 200). The parameter(s) may be predetermined by the processing device 120 or may be determined according to a specific condition as the specific condition occurs. Exemplary conditions may include that a scanner image of the subject indicates that a position or shape of the treatment region to be treated is changed. In some embodiments, the parameter(s) may be preset in a treatment plan.

In some embodiments, only a portion of the leaf assembly 220 that shields the radiation beam may have a high atomic number material (e.g., tungsten), while the peripheral support structure(s) of the leaf assembly 220 may include one or more lighter-weight materials. In some embodiments, a portion of a leaf in the leaf assembly 220 may be made of a substantially-radiation-impermeable material (e.g., tungsten), while the remaining portion of the leaf may be made of one or more other materials (e.g., a material that is less dense and/or lighter than the substantially-radiation-impermeable material, such as stainless steel or titanium). For example, a first section of the substantially-radiation-impermeable portion of a leaf that is in the radiation path may be substantially solid, while a second section of the substantially-radiation-impermeable portion of the leaf that is not in the radiation path may have one or more hollow regions.

Each of the plurality of driving assemblies 260 may be associated with one of the plurality of leaves (e.g., the leaf 220-1, the leaf 220-2, the leaf 220-*i*, . . . , the leaf 220-*n*, etc.). Each of the plurality of driving assemblies 260 (e.g., the driving assembly 260-1, the driving assembly 260-2, the driving assembly 260-*i*, . . . , the driving assembly 260-*n*, etc.) may drive a corresponding leaf of the plurality of leaves (e.g., the leaf 220-1, the leaf 220-2, the leaf 220-*i*, . . . , the leaf 220-*n*, etc.) to move independently in the carriage 240 to form the radiation field. For example, each one of the plurality of leaves (e.g., the leaf 220-1, the leaf 220-2, the leaf 220-*i*, . . . , the leaf 220-*n*, etc.) may be driven by one of the plurality of driving assemblies 260 to move toward the center of the radiation field. As another example, each of the plurality of leaves (e.g., the leaf 220-1, the leaf 220-2, the leaf 220-*i*, . . . , the leaf 220-*n*, etc.) may be driven by one of the plurality of driving assemblies 260 to move away from the center of the radiation field. In some embodiments, each of the plurality of driving assemblies 260 may be caused to drive one of the plurality of leaves to move independently or separately from other leaves of the leaf assembly 220 in the MLC 200. In some embodiments, two or more driving assemblies 260 may be caused to drive corresponding leaves to move synchronously.

In some embodiments, at least one of the plurality of driving assemblies 260 may include one or more driving components. For example, each of the plurality of driving assemblies 260 may include a motor. The motor may be configured to drive a corresponding leaf to a desired target position for shaping a radiation field. The desired target position may be determined based on the treatment plan. As another example, each of the plurality of driving assemblies 260 may include a driving component and a braking component. The driving component may be configured to drive a corresponding leaf toward a desired first position with a speed exceeding a speed threshold. The braking component may be configured to stop the leaf at an actual first position by providing a first force on the leaf within a time period in response to a determination that the leaf arrives at the desired first position. In some embodiments, the desired first position may be the same as the desired target position. In some embodiments, the desired first position may be close to the desired target position. For example, a distance between the desired first position and the desired target position may be smaller than 1 millimeter, 2 millimeters, 3 millimeters, etc. More descriptions regarding the driving component and the braking component may be found elsewhere in the present disclosure (e.g., FIGS. 4-6 and the descriptions thereof).

It should be noted that the description of the MLC 200 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the plurality of leaves 220 in the MLC 200 may be arranged in two or more layers. As another example, each of the plurality of driving assemblies 260 may include position detection apparatus configured to acquire parameters (e.g., a position, a speed, etc.) of a corresponding leaf driven by the driving assembly. As a further example, the MLC 200 may include a Y-JAW and an X-JAW.

Figure 3:
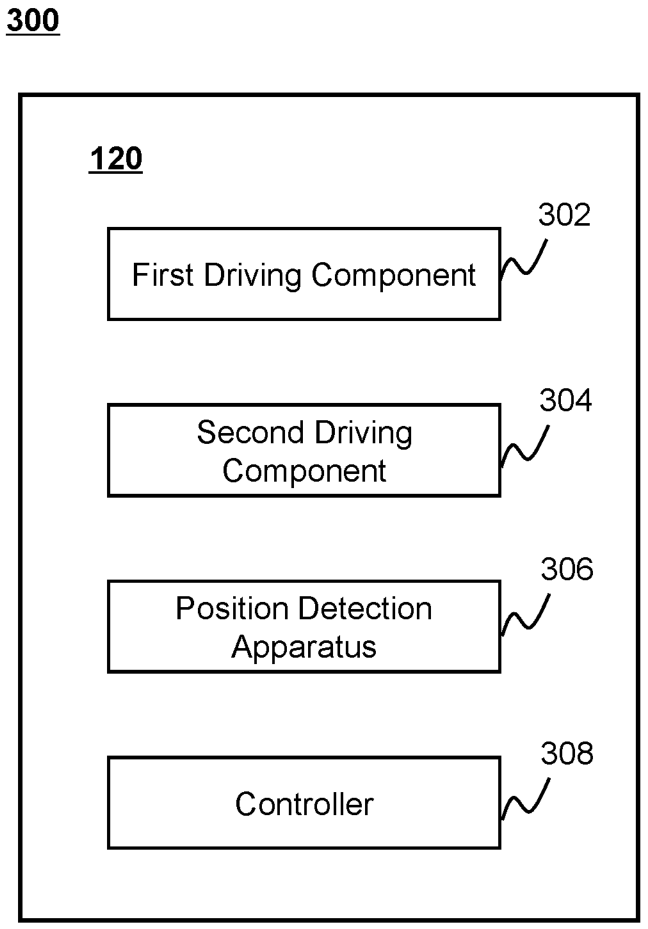
FIG. 3 is a block diagram illustrating an exemplary driving assembly of a leaf in a multi-leaf collimator (MLC) according to some embodiments of the present disclosure.

FIG. 3 is a block diagram illustrating an exemplary driving assembly of a leaf in a multi-leaf collimator (MLC) according to some embodiments of the present disclosure. As illustrated in FIG. 3, the driving assembly 300 may include a driving component 302, a braking component 304, a position detection apparatus 306, and a controller 308. The driving assembly 300 may be configured to drive a leaf in an MLC to a desired target position for shaping a radiation field. In some embodiments, the desired target position of the leaf may be such that an area formed by the projected radiation field on a subject may comply with the shape of the ROI (i.e., a treatment region) of the subject (e.g., tumor) to prevent healthy tissues around the ROI from being radiated. In some embodiments, the desired target position of the leaf may be a default setting of the system 100. For example, the desired target position of the leaf may be determined by the system 100 according to a treatment plan of the subject.

The driving component 302 may be configured to drive the leaf toward a desired position (e.g., a desired first position). In some embodiments, the driving component 302 may be configured to drive the leaf toward the desired first position with a speed (also referred to as a first speed) exceeding a speed threshold. In some embodiments, the speed threshold may exceed 100 millimeters per second. In some embodiments, the speed threshold may exceed 200 millimeters per second.

In some embodiments, the driving component 420 may include an actuator that is able to drive the leaf 410 to move with the first speed exceeding the speed threshold. Exemplary actuators may include a pneumatic actuator, a hydraulic actuator, an electric actuator, a mechanical actuator, or the like, or any combination thereof. More descriptions regarding the driving component may be found elsewhere in the present disclosure (e.g., FIGS. 4A-5 and the descriptions thereof).

The braking component 304 may be configured to stop the leaf at an actual position during the moving of the leaf. In some embodiments, the braking component 304 may stop the leaf at the actual first position in response to receiving a braking signal for stopping the leaf at the desired first position. In some embodiments, after the braking component 304 stops the leaf at the actual first position, the braking component 304 may be further configured to drive the leaf toward the desired target position from the actual first position. In some embodiments, the braking component 304 may be configured to drive the leaf to move with the second speed by providing a second force on the leaf. The braking component 304 may be further configured to stop the leaf at an actual target position in response to a determination that the leaf arrives at the desired target position. More descriptions regarding the braking component may be found elsewhere in the present disclosure (e.g., FIGS. 4A-4C, and FIG. 6 and the descriptions thereof).

In some embodiments, the speed of a leaf driven by the driving component or the braking component may be associated with a driving speed of the driving component or the braking component. The driving speed provided by the driving component or the braking component may be associated with one or more operation parameters of the driving component or the braking component. For different driving components, the one or more operation parameters may be different. More descriptions for the operation parameters may be found elsewhere in the present disclosure (e.g., FIGS. 4A-6 and the descriptions thereof).

The position detection apparatus 306 may be configured to acquire measurement data associated with an actual position of the leaf. The measurement data may include an actual position of the leaf, a displacement of the leaf, a current velocity of the leaf, etc. In some embodiments, the position detection apparatus 306 may detect the actual position of the leaf directly. In some embodiments, the position detection apparatus 306 may detect a displacement of the leaf, and the actual position of the leaf may be determined based on the displacement of the leaf and an initial position of the leaf. The current velocity of the leaf may be determined based on the displacement of the leaf and a time for the movement of the leaf. The position detection apparatus 306 may include any apparatus (e.g., encoders) or system that may detection a position of the leaf. The position detection apparatus 306 may include a magnetic displacement sensor (e.g., a Hall effect sensor), a grating displacement sensor, a potentiometer (e.g., a potentiometer mounted on the driving assembly), or the like, or any combination thereof. In some embodiments, the leaf may have one sensor. For example, the leaf may have a magnetic displacement sensor mounted on the leaf. In some embodiments, the leaf may have two or more corresponding sensors. For example, the leaf may have a magnetic displacement sensor mounted on the leaf and an encoder mounted on the driving component 302.

In some embodiments, the position detection apparatus 306 may be in communication with the driving component 302, the braking component 306, and/or the controller 308 via network. For example, the position detection apparatus 306 may transmit the measurement data associated with the actual position of the leaf to the driving component 302, the braking component 306, and/or the controller 308.

The controller 308 may be configured to control the driving component 302 and/or the braking component 304 to drive and/or stop the leaf based on a control signal (e.g., a driving signal, a braking signal, etc.). If the controller 308 determines that the leaf arrives at the desired first position and/or the desired target position based on the measurement data associated with the actual position of the leaf, the control signal may include a braking signal for stopping the leaf. For example, the controller 308 may send the braking signal to the braking component 304 to stop the leaf in response to receiving the braking signal. As another example, the controller 308 may send the braking signal to the driving component 302 to shut off the driving component 302 in response to receiving the braking signal. If the controller 308 determines that the leaf does not arrive at the desired first position and/or the desired target position, the control signal may include a driving signal for driving the leaf. For example, the controller 308 may send the driving signal to control the driving component 304 to cause the leaf to move. If the controller 308 determines that a difference between the actual first position and the desired first position is larger than a distance threshold (also referred to as a second threshold distance), the control signal may include a driving signal for driving the leaf. For example, the controller 308 may send the driving signal to the braking component 304 to cause the leaf to move.

In some embodiments, the controller 308 may include one or more processors integrated into the driving component 302, the braking component 306, the position detection apparatus 306, etc. For example, the position detection apparatus 306 (e.g., a controller or processor in the position detection apparatus 306) may be configured to generate a braking signal for stopping the leaf in response to the determination that the leaf arrives at the desired first position and transmit the braking signal to the braking component. As another example, the position detection apparatus 306 (e.g., a controller or processor in the position detection apparatus 306) may be configured to generate a driving signal for driving the leaf to move in response to a determination that the leaf does not arrive at the desired first position and transmit the driving signal to the driving component. As still another example, the position detection apparatus 306 (e.g., a controller or processor in the position detection apparatus 306) may be configured to generate a driving signal for driving the leaf to move in response to a determination that the actual first position is different from the desired first position and transmit the driving signal to the braking component; and In some embodiments, the controller 308 may include one or more processors (e.g., the processing device 120) that are physically separated from the driving component 302, the braking component 306, the position detection apparatus 306, etc. For example, the controller 308 may generate one or more control signals and transmit the one or more control signals to the driving component 302, the braking component 306, the position detection apparatus 306, etc.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the controller 308 may include a first controller configured to control the driving component 302 and a second controller configured to control the braking component 304. However, those variations and modifications do not depart the scope of the present disclosure.

Figure 4A:
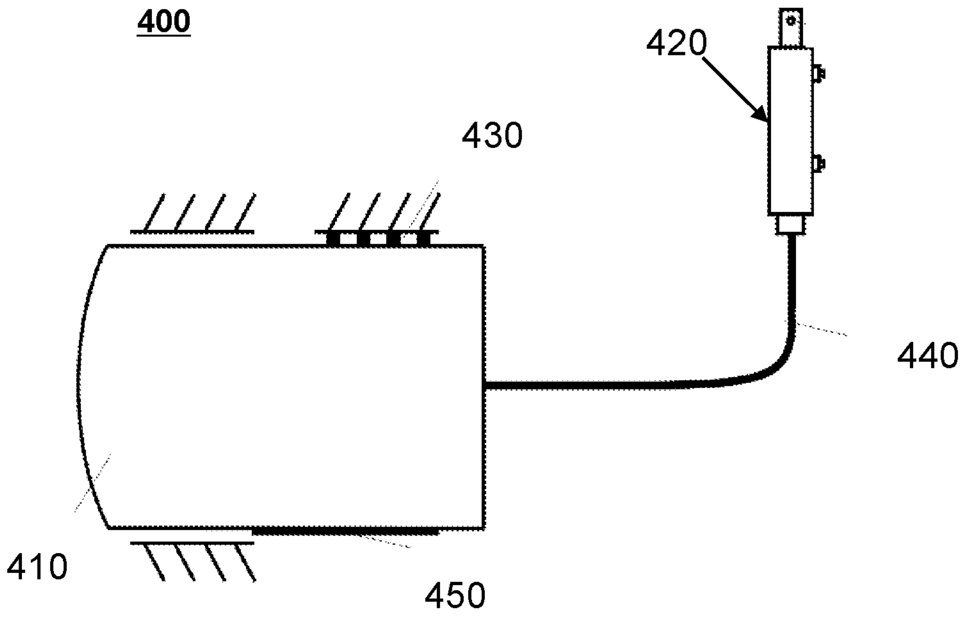
FIG. 4A is a schematic diagram illustrating an exemplary driving assembly of a leaf in a multi-leaf collimator (MLC) according to some embodiments of the present disclosure.

FIG. 4A is a schematic diagram illustrating an exemplary driving assembly 400 according to some embodiments of the present disclosure. The driving assembly 400 may be a driving assembly of a leaf 410 in a multi-leaf collimator (MLC). For example, the leaf 410 may be an exemplary embodiment of the leaf in the leaf assembly 210 of the MLC 200. More descriptions regarding the leaf may be found elsewhere in the present disclosure (e.g., FIG. 2 and the descriptions thereof).

The driving assembly 400 may be configured to drive the leaf 410 to a desired target position for shaping a radiation field. In some embodiments, the desired target position of the leaf 410 may be such that an area formed by the projected radiation field on a subject may comply with the shape of the ROI (i.e., a treatment region) of the subject (e.g., tumor) to prevent healthy tissues around the ROI from being radiated. In some embodiments, the desired target position of the leaf 410 may be a default setting of the system 100. For example, the desired target position of the leaf 410 may be determined by the system 100 according to a treatment plan of the subject.

As illustrated in FIG. 4A, the driving assembly 400 may include a driving component 420, a braking component 430, a transmission part 440, and a position detection apparatus 450. It should be noted that the descriptions of the single driving component 420 and/or the single braking component 430 as shown in FIG. 4 are merely provided for illustration, and not intended to limit the scope of the present disclosure. It is understood that the assembly 400 may include more than one driving component and/or more than one braking component. For example, more than one braking component may be arranged on two sides of the leaf 410, respectively. The two sides may be parallel to the direction of the movement of the leaf 410.

The driving component 420 may be configured to drive the leaf 410 toward a desired position (e.g., a desired first position). In some embodiments, the driving component 420 may be configured to drive the leaf 410 toward the desired first position with a speed (also referred to as a first speed) exceeding a speed threshold. The speed threshold refers to the minimum speed of the driving component 420. In some embodiments, the speed threshold may exceed 100 millimeters per second. In some embodiments, the speed threshold may exceed 120 millimeters per second. In some embodiments, the speed threshold may exceed 150 millimeters per second. In some embodiments, the speed threshold may exceed 180 millimeters per second. In some embodiments, the speed threshold may exceed 200 millimeters per second. In some embodiments, the speed threshold may exceed 220 millimeters per second. In some embodiments, the speed threshold may exceed 250 millimeters per second. In some embodiments, the speed threshold may exceed 300 millimeters per second. In some embodiments, the speed threshold may exceed 400 millimeters per second.

In some embodiments, the driving component 420 may include an actuator that is able to drive the leaf 410 to move with the first speed exceeding the speed threshold. Exemplary actuators may include a pneumatic actuator, a hydraulic actuator, an electric actuator, a mechanical actuator, or the like, or any combination thereof.

The pneumatic actuator may convert energy of gas pressure to a mechanical movement. The pneumatic actuator may include a pneumatic cylinder. A driving force may be generated from pressure changes in the pneumatic cylinder. The leaf 410 may be driven to move by the driving force. The first speed may be associated with the speed of a piston in the pneumatic cylinder. The speed of a piston in the pneumatic cylinder may be associated with operation parameters of the pneumatic actuator, such as a diameter of the pneumatic cylinder, the flow rate of an electromagnetic valve, the air supply quantity of an air source, etc. The first speed may be determined and/or adjusted based on the operation parameters. More descriptions regarding the pneumatic actuator may be found elsewhere in the present disclosure (e.g., FIG. 5 and the descriptions thereof).

The hydraulic actuator may convert energy of liquid pressure to a mechanical movement. The hydraulic actuator may include a pneumatic cylinder or fluid motor that uses the hydraulic power to generate a driving force. The pneumatic cylinder may include a hollow tube along which a piston can slide. A hydraulic liquid may be controlled by operating a hydraulic control valve to obtain a pressure or flow rate of the hydraulic liquid. The pressure or flow rate of the hydraulic liquid may generate the driving force through the piston in the hollow tube. The hydraulic actuator may be similar to the pneumatic actuator. For example, the first speed may be associated with the speed of a piston in the hydraulic cylinder. The speed of the piston in the hydraulic cylinder may be associated with operation parameters of the hydraulic actuator, such as a diameter of the pneumatic cylinder, the flow rate of the hydraulic control valve, the hydraulic liquid supply quantity, etc.

The electric actuator may convert an electric energy to a mechanical movement. Exemplary electric actuators may include an electromechanical actuator, an electrohydraulic actuator, a linear motor, etc. The electromechanical actuator may convert a rotation force of an electric rotary motor into a linear movement to generate a requested linear movement through a mechanism such as a belt (e.g., a belt drive axis with stepper or servo), a screw (e.g., a ball, a lead screw, etc.), etc. The electrohydraulic actuator may include an electric motor and a hydraulic accumulator. The electric motor may provide torque to operate the hydraulic accumulator to transmit a driving force. The linear motor may generate a linear force along a length direction of the linear motor. The operation parameters of an electric actuator may include the number of poles of an electric motor, the frequency of power supply, a current, a voltage, etc.

The mechanical actuator may execute one kind of motion by converting another kind of motion. For example, the mechanical actuator may execute a linear motion by converting a rotary motion. The driving of a mechanical actuator may be based on combinations of structural components, such as gears and rails, pulleys and chains, racks and pinions, or the like, or any combination thereof.

In some embodiments, the driving component 420 may be connected to the leaf 410 through the transmission part 440. Therefore, the driving component 420 may drive the leaf 410 toward the desired first position by driving the transmission part 440. In some embodiments, the transmission part 440 may be integrated into the driving component 420.

The transmission part 440 may be configured to transmit a driving force from the driving component 420 to the leaf 410. In some embodiments, the transmission part 440 may include a mechanical transmission part, an electric transmission part, a pneumatic transmission part, a hydraulic transmission part, or the like, or any combination thereof. The mechanical transmission part may include a gear, a belt, a chain, a shaft, a bearing, or the like, or any combination thereof. Exemplary shafts may include a flexible shaft, a rigid shaft, or the like, or any combination thereof. In some embodiments, the flexible shaft may be a shaft that is flexible but has some torsional stiffness. The flexible shaft may include a rotating wire rope, a coil, a hose, etc. A material of the flexible shaft may include stainless steel, aluminum alloy, rubber, plastic, or the like, or any combination thereof. Exemplary flexible shafts may include a wrapping flexible shaft, a universal joint, a spring flexible shaft, or the like, or any combination thereof. In some embodiments, a sleeve may be sheathed outside the flexible shaft. The sleeve may be configured to restrict a movement route of the flexible shaft. In other words, the flexible shaft may move along the sleeve. In some embodiments, the sleeve may be made of a rigid material, such as metal, rigid plastics, etc. An inner diameter of the sleeve may be larger than a diameter of the flexible shaft. Therefore, the flexible shaft may slide or move freely in the sleeve. A difference between the inner diameter of the sleeve and the diameter of the flexible shaft may be smaller than a diameter threshold, such as 1 millimeter, 0.5 millimeters, etc., which may ensure that the flexible shaft may not bend or bend very little, such that a movement distance of a transmission portion (e.g., a piston, a removable membrane, etc.) of the driving component 420 and/or the leaf 410 is substantially equal to a movement distance of the flexible shaft.

The rigid shaft may be made of a rigid material. The rigid material may include metal, rigid plastics, etc. The electric transmission part may include an alternating current (AC) transmission part (e.g., a frequency conversion speed regulator) and a direct current (DC) transmission part (e.g., a silicon controlled speed regulator). The pneumatic transmission part refers to a transmission part that uses compressed air as a transmission medium. The hydraulic transmission part refers to a transmission part that uses a liquid as a transmission medium. The hydraulic transmission part may include a hydraulic transmission part, a hydraulic viscous transmission part, etc.

In some embodiments, one end of the transmission part 440 may be connected to the leaf 410, and the other end of the transmission part 440 may be connected to the driving component 420. Therefore, when the driving component 420 is operating, the transmission part 440 may be driven to move by the driving component 420, thereby driving the leaf 410 to move. The connection may include a screwing connection, a welding connection, a riveting connection, an interference-fit connection, or the like, or any combination thereof. In some embodiments, the connection between the transmission part 440 and the leaf 410 may be the same as the connection between the transmission part 440 and the driving component 420. For example, the connection between the transmission part 440 and the leaf 410 may be the welding connection, and the connection between the transmission part 440 and the driving component 420 may also be the welding connection. In some embodiments, the connection between the transmission part 440 and the leaf 410 may be different from the connection between the transmission part 440 and the driving component 420. For example, the connection between the transmission part 440 and the leaf 410 may be the screwing connection, and the connection between the transmission part 440 and the driving component 420 may be the welding connection.

In some embodiments, the driving component 420 may drive the leaf 410 to move after the driving component 420 is started and the driving component 420 may stop driving the leaf 410 to move after the driving component 420 is shut off. When the leaf 410 is moving with a high speed driven by the driving component 420, the leaf 410 may be not stopped immediately at the desired first position or any other desired position under the inertial action after the driving component 420 is shut off. Specially, for the pneumatic actuator that may drive the leaf to move with a high speed (e.g., exceeding 200 millimeters per seconds), the pneumatic actuator may only include two states of opening and closing, and the leaf cannot be stopped in the moving of the leaf driven by the pneumatic actuator. Thus, through the driving component 420, the leaf 410 may be driven to move fast toward the desired first position, but the leaf 410 may be not able to be stopped at the desired first position or a position close to the desired first position.

The braking component 430 may be configured to stop the leaf 410 at an actual position during the moving of the leaf 410. For example, the braking component 430 may be configured to stop the leaf 410 at an actual first position by providing a first force on the leaf 410 in response to a determination that the leaf 410 arrives at the desired first position. The first force may be equal to or exceed the driving force provided by the driving component 420. The direction of the first force may be opposite to the direction of the driving force provided by the driving component 420. A distance (also referred to as a first distance) between the desired first position and the actual first position may be less than a distance threshold (also referred to as a first distance threshold). The first distance threshold refers to a maximum distance between the desired first position and the actual first position. In some embodiments, the first distance threshold may be less than 1 millimeter. In some embodiments, the first distance threshold may be less than 0.5 millimeters. In some embodiments, the first distance threshold may be less than 0.3 millimeters. In some embodiments, the first distance threshold may be less than 100 microns. In some embodiments, the first distance threshold may be less than 50 microns. In some embodiments, the first distance threshold may be less than 30 microns. In some embodiments, the first distance threshold may be less than 10 microns. In some embodiments, the first distance threshold may be less than 5 microns. In some embodiments, the first distance threshold may be less than 3 microns. In some embodiments, the first distance threshold may be less than 2 microns. In some embodiments, the first distance threshold may be less than 1 micron. Therefore, the braking component 430 may immediately provide the first force on the leaf 410 in response to the determination that the leaf 410 arrives at the desired first position, such that the actual stopped position (e.g., the actual first position) of the leaf may be close to or the same as the desired position (e.g., the desired first position).

In some embodiments, the braking component 430 may stop the leaf 410 at the actual first position in response to receiving a braking signal for stopping the leaf 410 at the desired first position. The braking component 430 may stop the leaf 410 during a response time (or a time period). In some embodiments, the time period from the time when the braking component 430 receives the braking signal (or the time when the braking signal is generated) to the time when the braking component 430 stops the moving of the leaf 410 may be the response time of the braking component 430. In some embodiments, the length of the response time of the braking component 430 may be less than a time threshold, such that the actual stopped position (e.g., the actual first position) of the leaf may be close to or the same as the desired position (e.g., the desired first position) when the leaf 410 is moving in a high speed (e.g., exceeding 200 millimeters per second). In some embodiments, the length of the response time of the braking component 430 may be less than 1 millisecond. In some embodiments, the length of the response time of the braking component 430 may be less than 500 microseconds. In some embodiments, the length of the response time of the braking component 430 may be less than 100 microseconds. In some embodiments, the length of the response time of the braking component 430 may be less than 50 microseconds. In some embodiments, the length of the response time of the braking component 430 may be less than 30 microseconds. In some embodiments, the length of the response time of the braking component 430 may be less than 20 microseconds. In some embodiments, the length of the response time of the braking component 430 may be less than 10 microseconds. In some embodiments, the length of the response time of the braking component 430 may be less than 5 microseconds. In some embodiments, the length of the response time of the braking component 430 may be less than 4 microseconds. In some embodiments, the length of the response time of the braking component 430 may be less than 2 microseconds. In some embodiments, the braking signal may be generated by a controller (e.g., the controller 308) in the driving assembly 400 (e.g., a controller in the position detection apparatus, or a controller in the braking component 430), or any other controller that is separated from the driving assembly 400 (e.g., the processing device 120, the determination module 806, the second control module 808, etc.) in response to the determination that the leaf 410 arrives at the desired first position. In some embodiments, the braking signal may include the determination that the leaf 410 arrives at the desired first position. In some embodiments, the braking signal may be transmitted to the driving component 410, and the driving component 410 may be shut off in response to receiving the braking signal.

In some embodiments, the actual first position may be different from the desired first position or a distance between the actual first position and the desired first position may exceed a distance threshold (also referred to as a third distance threshold). The braking component 430 may drive the leaf 410 to the desired first position in response to receiving a driving signal for driving the leaf to move in response to a determination that the actual first position is different from the desired first position or the distance between the actual first position and the desired first position may exceed the third distance threshold. In some embodiments, the driving signal for driving the leaf to the desired first position may be generated by a controller (e.g., the controller 308) in the driving assembly 400 (e.g., a controller in the position detection apparatus, or a controller in the braking component 430), or any other controller that is separated from the driving assembly 400 (e.g., the processing device 120, the determination module 806, the second control module 808, etc.) in response to the determination that the leaf 410 arrives at the desired first position.

In some embodiments, the desired first position may be the same as the desired target position. In some embodiments, the desired first position may be different from the desired target position. In some embodiments, a distance between the desired first position and the desired target position may be determined according to parameters of the driving assembly. For example, the distance between the desired first position and the desired target position may be determined according to a ratio of the first speed of the leaf 410 driven by the driving component 410 and a second speed of the leaf 410 driven by the braking component 430. The greater the ratio of the first speed and the second speed is, the smaller the distance between the desired first position and the desired target position may be. In some embodiments, the distance between the desired first position and the desired target position may be determined according to a default setting of the system 100. For example, the distance between the desired first position and the desired target position may be determined based on a ratio of the distance between the desired first position and the desired target position and a total distance that the leaf 410 needs to move.

In some embodiments, after the braking component 430 stops the leaf 410 at the actual first position, the braking component 430 may be further configured to drive the leaf 410 toward the desired target position from the actual first position. In some embodiments, the braking component 430 may be configured to drive the leaf 410 to move with the second speed by providing a second force on the leaf 410. The second force may be the same as or different from the driving force provided by the driving component 420. The direction of the second force may be the same as the direction of the driving force provided by the driving component 420. In some embodiments, the second force may be smaller than the first force provided by the braking component 430. The direction of the second force may be different from the direction of the first force provided by the braking component 430. In some embodiments, the second speed may be less than 20 millimeters per second. In some embodiments, the second speed may be less than 15 millimeters per second. In some embodiments, the second speed may be less than 10 millimeters per second. In some embodiments, the second speed may be less than 5 millimeters per second. In some embodiments, the second speed may be lower than the first speed. The driving component 420 may drive the leaf 410 with a high speed, such that the leaf 410 may arrive at the desired target position quickly, and the braking component 430 may drive the leaf 410 with a low speed, such that the actual target position of the leaf 410 may be controlled to be close to or the same as the desired target position, thereby improving the accuracy and efficiency of the positioning of the leaf 410. For example, the first speed may exceed 150 millimeters per second, while the second speed may exceed 10 millimeters per second. The braking component 430 may be further configured to stop the leaf at an actual target position in response to a determination that the leaf arrives at the desired target position. For example, the braking component 430 may be shut off to stop the leaf. A second distance between the desired target position and the actual target position may be less than a distance threshold (also referred to as a fourth distance threshold). The fourth distance threshold refers to a maximum distance between the desired target position and the actual target position. In some embodiments, the fourth distance threshold may be less than 1 millimeter. In some embodiments, the fourth distance threshold may be less than 0.5 millimeters. In some embodiments, the fourth distance threshold may be less than 0.3 millimeters. In some embodiments, the fourth distance threshold may be less than 100 micros. In some embodiments, the fourth distance threshold may be less than 50 microns. In some embodiments, the fourth distance threshold may be less than 30 microns. In some embodiments, the fourth distance threshold may be less than 10 microns. In some embodiments, the fourth distance threshold may be less than 5 microns. In some embodiments, the fourth distance threshold may be less than 3 microns. In some embodiments, the fourth distance threshold may be less than 2 microns. In some embodiments, the fourth distance threshold may be less than 1 micron.

In some embodiments, the second distance between the desired target position and the actual target position may be less than the distance (also referred to as a first distance) between the desired first position and the actual first position for the same braking component 430. The fourth distance threshold may be less than the first distance threshold. For example, the first distance threshold may be less than 1 millimeter, and the fourth distance threshold may be less than 0.5 millimeters.

Figure 4B:
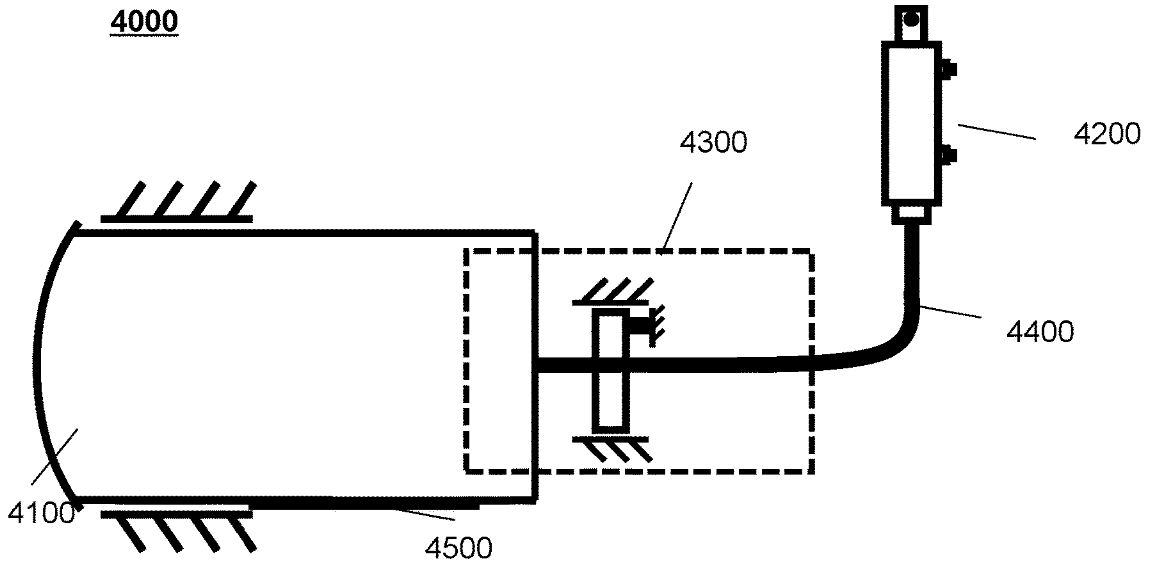
FIG. 4B is a schematic diagram illustrating another exemplary driving assembly according to some embodiments of the present disclosure.

In some embodiments, the braking component 430 may include an actuator with a sensitive response and accurate distance control. Exemplary drivers may include a piezoelectric actuator, an electric actuator, a thermal or magnetic actuator, or the like, or any combination thereof. The braking component 430 may include one or more displacement parts (e.g., deformable parts). One of the one or more displacement parts may perform a displacement under the action of electric, magnetic, and force. The displacement may include a displacement of a portion of the displacement part (e.g., deformation of at least a portion of the displacement part), or a displacement of the whole of the displacement part, etc. In some embodiments, the displacement part that performs the displacement may generate a force (e.g., the first force, the second force) between the leaf 410 when the displacement part contacts with the leaf 410. The force (e.g., the first force, the second force) may be configured to drive or stop the leaf 410. For example, when the braking component 430 includes the piezoelectric actuator, the displacement part may include a deformable part made of a piezoelectric material. The deformable part may be deformed under the action of electric, magnetic, and force. The deformed deformable part may contact the leaf 410 and provide a force (e.g., a pressure and/or a friction) on the leaf 410 to drive the leaf 410 to move or stop the leaf 410 from moving. As another example, the displacement part may move toward the leaf 410 under the action of a force and transmit the force to the leaf 410 to drive the leaf 410 to move or stop the leaf 410 from moving. In some embodiments, as shown in FIG. 4A, the braking component 430 may be located above a surface of the leaf 410 that is substantially parallel to the movement direction of the leaf 410. In some embodiments, as shown in FIG. 4B, the braking component 430 may be located beside a surface of the leaf 410 that is substantially perpendicular to the movement direction of the leaf 410. In some embodiments, the one or more displacement parts may be connected in series along a direction perpendicular to the movement direction of the leaf 410. The total length of the displacement parts along the displacement direction of the displacement parts or along a direction perpendicular to the movement direction of the leaf 410 may be increased by connecting multiple displacement parts in series or increasing the length of each of the displacement parts. The total deformation degree of the displacement parts along the displacement direction of the displacement parts may be increased as the increasing of the total length, which may increase the force of the braking component applying on the leaf, thereby increasing the response time of the braking component for stopping the leaf. More descriptions regarding the piezoelectric actuator may be found elsewhere in the present disclosure (e.g., FIGS. 4B and 6 and the descriptions thereof). Exemplary electric actuators may include an electromechanical actuator, an electrohydraulic actuator, a linear motor, etc. The thermal or magnetic actuator may be triggered by temperature or heating through the Joule effect and tend to be compact, lightweight, economical, and with high power density. The thermal or magnetic actuator may be made of shape memory materials such as shape-memory alloys (SMAs), magnetic shape-memory alloys (MSMAs), etc.

The force (e.g., the first force, the second force) provided by the braking component 430 may be associated with one or more operation parameters of the braking component 430. For example, when the braking component 430 includes the piezoelectric actuator, the one or more operation parameters of the piezoelectric actuator may include a type of a current (e.g., DC or AC), a direction of a voltage corresponding to the current, a magnitude of the voltage, a vibration amplitude of the piezoelectric actuator, etc. Specifically, a magnitude of the force may be determined and/or adjusted based on a magnitude of an input voltage, a direction of the force may be adjusted based on a direction of the input voltage.

The second speed of the leaf 410 driven by the braking component 430 may be associated with one or more operation parameters of the braking component 430. For example, when the braking component 430 includes the piezoelectric actuator, the one or more operation parameters of the piezoelectric actuator may include a frequency of the voltage, a voltage magnitude, etc.

In some embodiments, as show in FIG. 4A, one end of the braking component 430 may be fixed on a portion of the driving assembly 400 (e.g., a carriage of the MLC, e.g., a carriage of a guide of the leaf), and the other end of the braking component 430 may be close to the leaf 410. The displacement direction of the displacement part may be substantially perpendicular to the movement direction of the leaf 410. In some embodiments, the other end of the braking component 430 may be parallel to a surface of the leaf 410. A distance between the braking component 430 and the leaf may be less than the displacement of one of the one or more displacement parts. That is, a force (e.g., the first force, the second force, etc.) generated by the braking component 430 may be directly acted on the leaf 410. In this case, there may be no transmission part between the braking component 430 and the leaf 410. For example, the braking component 430 may be arranged on an upper and/or below side of the leaf 410, and at least a portion of the braking component 430 may be directly in contact with the leaf 410 when the braking component 430 is operated. In some embodiments, the distance between the braking component 430 and the leaf may be larger than or equal to the displacement of one of the one or more displacement parts. The force generated by the braking component 430 may be indirectly acted on the leaf 410. In this case, there may be one or more transmission parts between the braking component 430 and the leaf 410. For example, the braking component 430 may be connected to the leaf 410 through a second transmission part. The second transmission part may be the same as or different from the transmission part 440. For example, the transmission part 440 and the second transmission part may be flexible shafts. As another example, the second transmission part may be one or more gears, and the transmission part 440 may be a flexible shaft.

The position detection apparatus 450 may be configured to acquire measurement data associated with an actual position of the leaf 410. More descriptions regarding the position detection apparatus may be found elsewhere in the present disclosure (e.g., FIG. 3 and the descriptions thereof). In some embodiments, the position detection apparatus 450 may include a plurality of sensors, and actual positions of the leaf 410 determined based on the measurement data from different sensors may be different. The actual positions of the leaf 410 may be further processed to obtain a finally actual position of the leaf 410. For example, a middle position may be obtained based on the actual positions of the leaf 410. The middle position may be designated as the actual final position of the leaf 410. As another example, a weighting coefficient corresponding to each of the plurality of sensors may be determined. A middle position may be obtained based on the actual positions of the leaf 410 and the weighting coefficient corresponding to each of the plurality of sensors. The middle position may be designated as the final actual position of the leaf 410. As still another example, the actual positions of the leaf 410 may be corrected based on a system error. The system error may be determined based on the driving assembly 400 (e.g., a type, a position, a precision, etc., of each of the plurality of sensors).

In some embodiments, whether the leaf 410 arrives at the desired first position may be determined based on the measurement data associated with the actual position of the leaf 410. In some embodiments, the measurement data associated with the actual position of the leaf 410 may be transmitted to a controller, e.g., a controller in the driving component 420, a controller in the braking component 420, a controller in the position detection apparatus 450, or any other processor of the system 100 (e.g., the first control module 804, the second control module 808). The controller may determine whether the leaf 410 arrives at the desired first position and/or the desired target position, and generate a control signal. If the controller determines that the leaf 410 arrives at the desired first position and/or the desired target position, the control signal may include a braking signal for stopping the leaf 410. For example, the processing device 120 may send the braking signal to the braking component 430 and the braking component 430 may stop the leaf 410 in response to receiving the braking signal. If the controller determines that the leaf 410 does not arrive at the desired first position and/or the desired target position, the control signal may include a driving signal for driving the leaf 410. For example, if the controller determines that the leaf does not arrive at the desired first position, the controller may generate a driving signal and transmit the driving signal to the driving component 420. The driving component 420 may cause the leaf 410 to move to the desired first position in response to receiving the driving signal. As another example, if the controller determines that the actual first position is different from the desired first position or a distance between the actual first position and the desired first position exceeds the third distance threshold, the controller may generate a driving signal to cause the braking component 430 to drive the leaf 450 to move toward the desired first position. In some embodiments, the actual position of the leaf 410 may be further transmitted to the terminal(s) 130 for display.

In some embodiments, the measurement data associated with the actual position of the leaf 410 may be transmitted to the driving component 420 and/or the braking component 430. The driving component 420 (e.g., a processor or a controller in the driving component 420) and/or the braking component 430 (e.g., a processor or a controller in the braking component 420) may determine whether the leaf 410 arrives at the desired first position. The driving component 420 (e.g., a processor or a controller in the driving component 420) and/or the braking component 430 (e.g., a processor or a controller in the braking component 420) may generate the control signal.

In some embodiments, the position detection apparatus 450 (e.g., a processor or a controller in the position detection apparatus 450) may determine whether the leaf 410 arrives at the desired first position based on the measurement data associated with the actual position of the leaf 410. The position detection apparatus 450 may generate the control signal and transmit the control signal to the driving component 420 (e.g., a processor or a controller in the driving component 420) and/or the braking component 430 (e.g., a processor or a controller in the braking component 420).

It should be noted that the description of the driving assembly 400 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the driving assembly 400 may include a controller configured to control the driving component 420 and the braking component 430.

FIG. 4B is a schematic diagram illustrating another exemplary driving assembly according to some embodiments of the present disclosure. The driving assembly 4000 as shown in FIG. 4B may be a driving assembly of a leaf 4100 in a multi-leaf collimator (MLC). For example, the leaf 4100 may be an exemplary embodiment of the leaf in the leaf assembly 210 of the MLC 200. More descriptions regarding the leaf may be found elsewhere in the present disclosure (e.g., FIG. 2 and the descriptions thereof).

As illustrated in FIG. 4B, the driving assembly 4000 may include a driving component 4200, a braking component 4300, a first transmission part 440, and a position detection apparatus 4500. The driving component 4200, the braking component 4300, the first transmission part 4400, and the position detection apparatus 4500 may be the same as or similar to the driving component 420, the braking component 430, the transmission part 440, and the position detection apparatus 450 of the driving assembly 400, respectively as described in FIG. 4A. For example, the driving component 4200 may include a pneumatic actuator. The braking component 4300 may include a piezoelectric actuator. The braking component 4300 may include one or more deformable parts 4310.

Figure 4C:
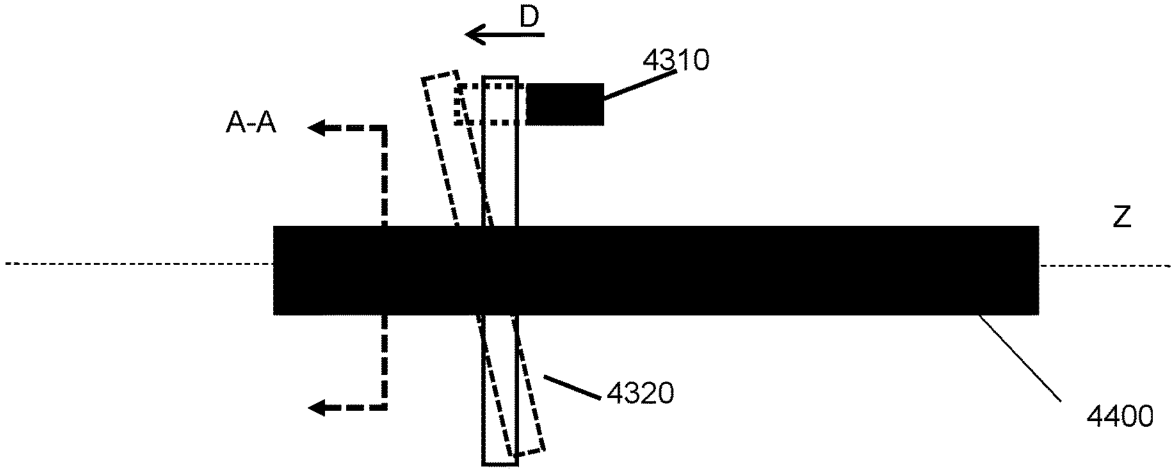
FIG. 4C is a schematic diagram illustrating a process of the braking component 4300 stopping the leaf 4100 according to some embodiments of the present disclosure.

Different from the driving assembly 400, as shown in FIG. 4B, the braking component 4300 may be located beside a surface of the leaf 410 that is substantially perpendicular to the movement direction of the leaf 4100. The displacement direction (or deformable direction, or a vibration direction) of the deformable parts 4310 may be substantially parallel to the movement direction of the leaf 4100. The braking component 4300 may further include a second transmission part 4320. The braking component 4300 may be configured to stop or brake the leaf 4100 when the leaf 4100 is moving, such as at a high speed (e.g., 200 millimeters per second). After the braking component 4300 receives a braking signal, the deformable parts 4310 may perform the deformation (e.g., shrinking or stretching) along a direction (i.e., a deformation direction) the same as or opposite to a movement direction of the leaf 4100 (e.g., the direction denoted by arrow D as shown in FIG. 4C). The deformation (e.g., shrinking or stretching) of the deformable parts 4310 may cause a first portion of the second transmission part 4320 that is physically contact with the deformable parts 4310 to move along a first direction after the deformable parts 4310 deforms; the deformation (e.g., shrinking or stretching) of the deformable parts 4310 may cause a second portion of the second transmission part 4320 that is not contact the deformable parts 4310 to move along a second direction after the deformable parts 4310 deforms. The first portion of the second transmission part 4320 moving along the first direction and the second portion of the second transmission part 4320 moving along the second direction may be such that the second transmission part 4320 may rotate in a plane parallel to the axis Z of the first transmission part 4440. The rotation of the second transmission part 4320 may cause the inner surface of the second transmission part 4320 contacts the first transmission part 4400 and provides a force on the first transmission part 4400. The force (e.g., a friction or pressure) on the first transmission part 4400 may increase along the increase of the deformation of the one or more deformable parts to stop the movement of the first transmission part 4400.

In some embodiments, one end of the deformable parts 4310 may be fixed on a portion of the driving assembly 400 (e.g., a carriage of the MLC, e.g., a carriage of a guide of the leaf, a base of the first driving component 4200), and the other end of the deformable parts 4310 may be close to the second transmission part 4320. The deformable parts 4310 may contact the second transmission part 4320 under the deformation and provide a force on the second transmission part 4320 to cause the second transmission part 4320 to deform or rotate.

In some embodiments, one end of the deformable parts 4310 may be fixed on the second transmission part 4320 and other end of the deformable parts 4310 may contact or close to a portion of the driving assembly 400 (e.g., a carriage of the MLC, e.g., a carriage of a guide of the leaf, a base of the first driving component 4200). The deformable parts 4310 may contact the portion of the driving assembly 400 (e.g., a carriage of the MLC, e.g., a carriage of a guide of the leaf, a base of the first driving component 4200) under the deformation. Under the resisting of the portion of the driving assembly 400 (e.g., a carriage of the MLC, e.g., a carriage of a guide of the leaf, a base of the first driving component 4200), the deformable parts 4310 may provide a force on the second transmission part 4320 to cause the second transmission part 4320 to deform or rotate.

It should be noted that the first direction and the second direction, and the configuration in FIGS. 4A and 4B are described for descriptions, in some embodiments, the deformation direction of the deformable parts 4310 may be perpendicular to the movement direction of the leaf 4100. The force provided by the deformable parts 4310 on the second transmission part 4320 may be parallel to the movement direction of the leaf 4100 (or the deformation direction of the deformable parts 4310). The force provided by the deformable parts 4310 may drive the second transmission part 4320 to move along a direction perpendicular to the movement direction of the leaf 4100, such that the inner side of the second transmission part 4320 may contact the first transmission part 4400 and provide a force on the first transmission part 4400 that may be increased along the increase of the deformation of the deformable parts 4310 to stop the movement of the first transmission part 4400.

In some embodiments, the braking component may further include one or more deformable parts that is connected with the second portion. When an electric signal is inputted into the braking component, the deformation direction of the deformable parts 4310 connected with the first portion and the deformation direction of the deformable parts connected with the second portion may be different such that the second transmission part may rotate in a plane parallel to the movement direction of the leaf or the axis of the second transmission part. For example, the deformable parts 4310 connected with the first portion may shrink while the deformable parts connected with the second portion may stretch. The first direction may be the same as the deformation direction of the deformable parts 4310; the second direction may be opposite the deformation direction of the deformable parts 4310. The first direction and the second direction may be opposite such that the inner surface of the second transmission part 4230 may contact the first transmission part 4400 (e.g., the flexible shaft) and generate a force on the first transmission part 4400 (e.g., the flexible shaft) along the increasing of the deformation degree of the deformable parts 4310. The first portion and the second portion may be located two sides of the first transmission part 4400. The force (e.g., a pressure and/or a friction) may be configured to drive or stop the movement of the first transmission part 4400 (e.g., the flexible shaft), thereby stopping or driving the movement of the leaf 4100. The force may be increased along the increasing of the deformation degree of the deformable parts 4310. In some embodiments, when the deformable parts 4310 is inputted into a direct current, the braking component 4300 may be configured to stop the movement of the first transmission part 4400 (e.g., the flexible shaft), thereby stopping the movement of the leaf 410; when the deformable parts 4310 is inputted into an alternating current, the deformable parts 4310 may repeatedly shrink and stretch (e.g., vibration), and the vibration of the deformable parts 4310 may drive the first transmission part 4400 (e.g., the flexible shaft) to move, thereby driving the movement of the leaf 4100.

For example, FIG. 4C is a schematic diagram illustrating a process of the braking component 4300 stopping the leaf 4100 according to some embodiments of the present disclosure. After the braking component 4300 receives a braking signal, the deformable parts 4310 may stretch along a direction (e.g., the direction denoted by arrow D as shown in FIG. 4C) opposite to a movement direction of the leaf 4100. The stretching of the deformable parts 4310 may cause the first portion of the second transmission part 4320 that is physically connected with the deformable parts 4310 to move along the first direction (i.e., the direction denoted by arrow D as shown in FIG. 4C); the stretching of the deformable parts 4310 may cause the second portion of the second transmission part 4320 that is not physically connected with the deformable parts 4310 to move along the second direction (i.e., a direction opposite to the direction denoted by arrow D as shown in FIG. 4C). The inner surface of the second transmission part 4320 may contact the first transmission part 4400 (e.g., the flexible shaft) and generate a force on the first transmission part 4400 (e.g., the flexible shaft). The force (e.g., a pressure and/or a friction) may be configured to stop the movement of the first transmission part 4400 (e.g., the flexible shaft), thereby stopping the movement of the leaf 4100.

In some embodiments, the second transmission part 4320 may be a hollow structure. For example, the second transmission part 4320 may include a sleeve, the sleeve may include an inner surface and an outer surface, and the inner surface may define a space, such that the second transmission part 4320 may be sleeved on the first transmission part 4400. In some embodiments, the first transmission part 4400 may include a flexible shaft or a rigid shaft. A size of the inner surface of the second transmission part 4320 may be larger than a diameter of the flexible shaft or the rigid shaft. The size of the inner surface of the second transmission part 4320 refers to a maximum distance from a center point to the inner surface on a cross-section perpendicular to the axis Z of the second transmission part 4320.

Figure 4D:
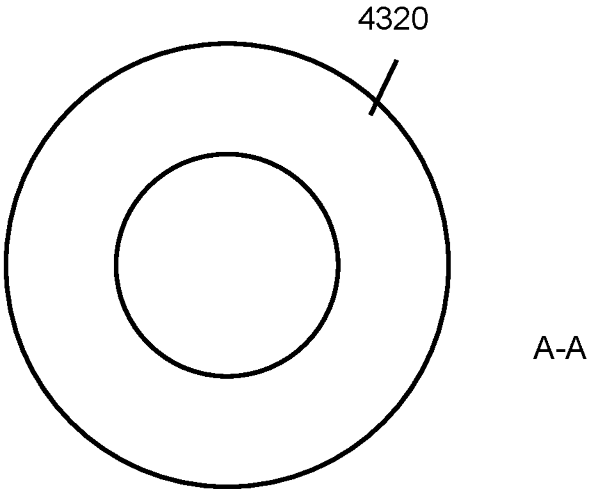
FIGS. 4D and 4E show schematic diagrams illustrating exemplary cross-sectional views of the second transmission part 4320 of the driving assembly 400 according to some embodiments of the present disclosure.
Figure 4E:
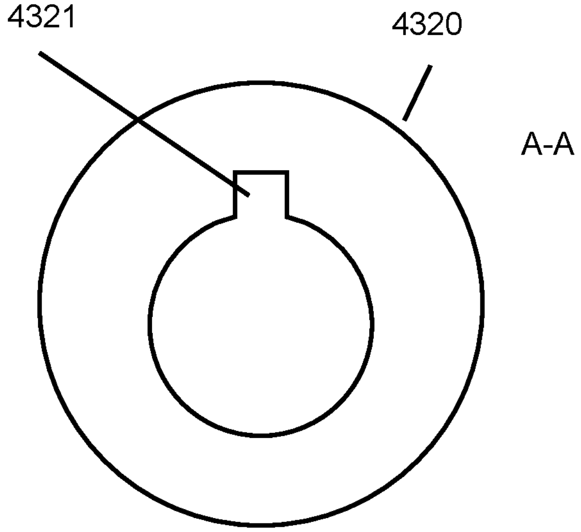

Therefore, the flexible shaft or the rigid shaft may slide or move freely in the second transmission part 4320. A difference between the diameter of the flexible shaft or the rigid shaft and the size of the inner surface of the second transmission part 4320 may be smaller than a threshold, such as 1 millimeter, 0.5 millimeters, etc. For example, FIGS. 4D and 4E show schematic diagrams illustrating exemplary cross-sectional views of the second transmission part 4320 of the driving assembly 400 according to some embodiments of the present disclosure. As shown in FIGS. 4D and 4E, the second transmission part 4320 may be an annular structure. The cross-sections of the inner surface and the outer surface of the second transmission part 4320 may be a circle. It should be noted that the cross-sections of the inner surface and the outer surface of the second transmission part 4320 may be other shapes, such as a triangle, a square, a rectangle, a trapezoid, an irregular shape, on oval, etc. In some embodiments, as shown in FIG. 4E, a groove 4321 may be provided on the inner surface along the axis of the second transmission part 4320. The axis Z of the second transmission part 4320 may be perpendicular to the cross-section of the second transmission part 4320 shown in FIG. 4E. The groove 4321 may match the first transmission part 4400, such that the first transmission part 4400 may snap into the groove 4321 when the deformable parts 4310 deforms and drive the second transmission part 4320 to move, such that the first transmission part 4400 cannot move in the groove 4321. The groove 4321 may serve as a clamping slot. More descriptions for the braking component and/or the deformable parts may be found in FIGS. 6A-6C.

In some embodiments, the one or more deformable parts 4310 may be connected in series along a direction parallel to the movement direction of the leaf. According to some embodiments of the present disclosure, the braking component 4300 may be located in a space between the leaf 4100 and the driving component 4200. The total length of the deformable parts 4310 along the deformation direction of the deformable parts 4310 (or along the axis Z of the second transmission part) may be increased by connecting multiple deformable parts in series or increasing the length of each of the deformable parts 4310 as the space between the leaf 4100 and the driving component 4200 is enough and idle. The total deformation degree of the deformable parts 4310 along the deformation direction of the deformable parts 431 may be increased as the increasing of the total length, which may increase the force of the second transmission part 4320 applying on the first transmission part 4400.

Figure 5:
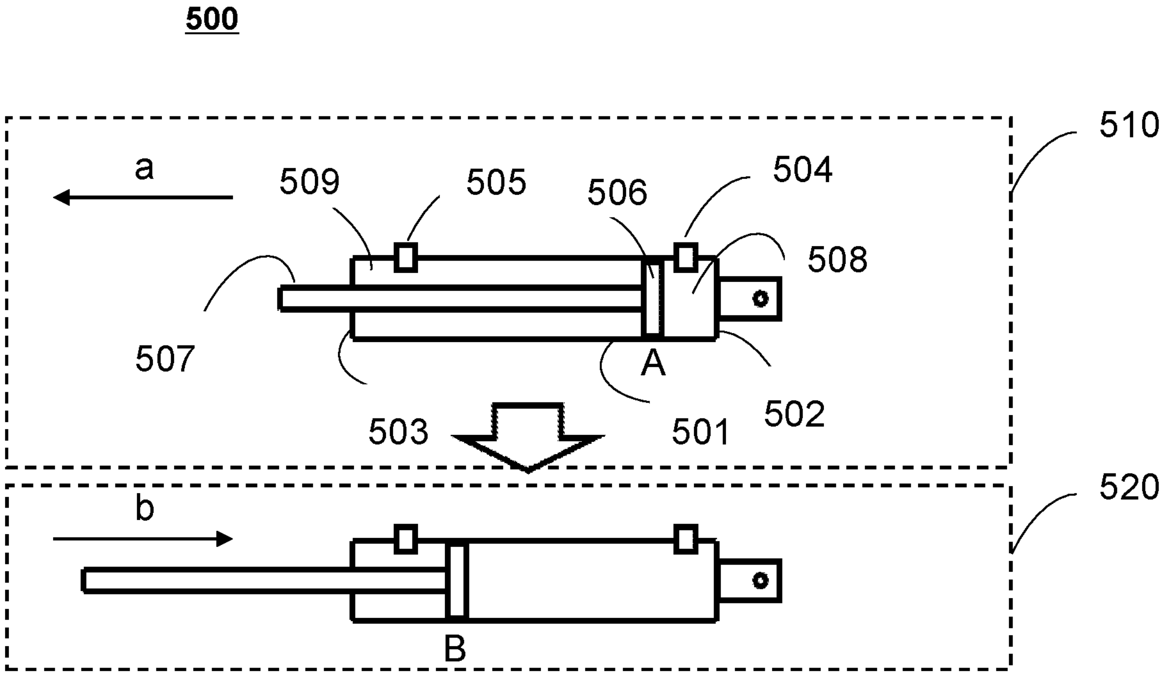
FIG. 5 is a schematic diagram illustrating an exemplary driving component of a multi-leaf collimator (MLC) according to some embodiments of the present disclosure.

FIG. 5 is a schematic diagram illustrating an exemplary driving component according to some embodiments of the present disclosure. The driving component may include a pneumatic actuator 500. It should be noted that the pneumatic actuator 500 is merely provided as an exemplary driving component, and not intended to limit the scope of the present disclosure. The exemplary methods described in the present disclosure may be applied in other actuators, such as a fluid-power actuator, a spring-based actuator, an electric-charge-based actuator, a magnetic actuator, a mechanical actuator, or the like.

As shown in FIG. 5, the pneumatic actuator 500 may include a pneumatic cylinder 501. In some embodiments, two ends of the pneumatic cylinder 501 may include a front end cover 502 and a rear end cover 503. A first air hole 504 and a second air hole 505 may be disposed on the front end cover 502 and the rear end cover 503, respectively. The pneumatic actuator 500 may include a piston 506 that can perform a linear and reciprocating motion inside the pneumatic cylinder 501 and a piston rod 507 connected with the piston 506. In some embodiments, the piston rod 507 may include or be connected with a rigid shaft, a flexible shaft, etc. The piston 506 and the piston rod 507 may be configured to transmit a driving force generated by the pneumatic actuator 500. In some embodiments, the piston 506 and the piston rod 507 may be an integrated structure. In some embodiments, the piston 506 and the piston rod 507 may be assembled detachably.

The pneumatic actuator 500 may also include an electromagnetic valve (not shown in FIG. 5) configured to control parameters (e.g., a direction, a speed, a flow rate, etc.) of compressed gas in the pneumatic cylinder 501. For example, a pipe may connect the first air hole 504 and the second air hole 505, and the electromagnetic valve may be disposed on the pipe to control the parameters of the compressed gas in the pneumatic cylinder 501. As another example, the pneumatic actuator 500 may further include a reservoir configured to store the compressed gas. A pipe may connect the reservoir and the first air hole 504, and the electromagnetic valve may be disposed on the pipe. At this time, the second air hole 505 may or may not be connected with the reservoir. In some embodiments, the electromagnetic valve may include a check valve, a double check valve, etc. When the pneumatic actuator 500 includes a double check valve or a plurality of check valves that have different transmission directions, the double check valve or the plurality of check valves may control the compressed gas to be input or output to the pneumatic cylinder 501 through the first air hole 504. When the pneumatic actuator 500 includes a check valve, the check valve may input the compressed gas into the pneumatic cylinder 501 through the first air hole 504, and an elastic component (e.g., a spring, a rubber band, etc.) connected the front end cover 502 and the piston 506 may output the compressed gas from the pneumatic cylinder 501 through the first air hole 504.

In some embodiments, when the electromagnetic valve is opened and drives the compressed gas to enter the pneumatic cylinder 501 through the first air hole 504, the compressed gas may be decompressed to increase a pressure of a first chamber 508. The first chamber 508 may be defined by the pneumatic cylinder 501, the front end cover 502, and the piston 506. The pressure of the first chamber 508 may be greater than a pressure of a second chamber 509. The second chamber 509 may be defined by the pneumatic cylinder 501, the rear end cover 503, and the piston 506. A pressure difference may push the piston 506 and the piston rod 507 to move in a direction from the front end cover 502 to the rear end cover 503 (as indicated by arrow a shown in FIG. 5). Gas in the second chamber 509 may be discharged from the second air hole 505. For example, when the electromagnetic valve is opened and drives the compressed gas to enter the pneumatic cylinder 501 through the first air hole 504, the pneumatic cylinder 501 may change from a state of dashed box 510 to a state of dashed box 520. The piston 506 and the piston rod 507 may move from position A toward position B shown in FIG. 5. When the pneumatic cylinder 501 is reset, the electromagnetic valve may be closed or reverse (i.e., control the decompressed gas in the first chamber 508 to flow out from the pneumatic cylinder 501 through the first air hole 504). The decompressed gas in the first chamber 508 may flow out from the pneumatic cylinder 501 through the first air hole 504 driven by the electromagnetic valve or the elastic component. Therefore, the pressure of the first chamber 508 may be decreased, which may result in that the pressure of the first chamber 508 may be smaller than the pressure of the second chamber 509. A pressure difference may push the piston 506 and the piston rod 507 to move in a direction from the rear end cover 503 to the front end cover 502 (as indicated by arrow b shown in FIG. 5). Gas (e.g., the compressed gas or the ambient air) may enter the pneumatic cylinder 501 (i.e., the second chamber 509) through the second air hole 505, and the decompressed gas may be discharged from the first air hole 504. For example, when the electromagnetic valve is closed or reversed, the pneumatic cylinder 501 may change from the state of dashed box 520 to the state of dashed box 510. The piston 506 and the piston rod 507 may move from position B toward position A shown in FIG. 5.

An end of the piston rod 507 apart away from the piston 506 may be connected to a transmission part (e.g., the transmission part 440). The connection between the piston 506 and the piston rod 507 may include a screwing connection, a welding connection, a riveting connection, an interference-fit connection, or the like, or any combination thereof. When the piston rod 507 moves along the direction from the front end cover 502 to the rear end cover 503, the transmission part may be driven away from the pneumatic cylinder 501. When the piston rod 507 moves along the direction from the rear end cover 503 to the front end cover 502, the transmission part may be driven close to the pneumatic cylinder 501. Accordingly, a leaf (e.g., the leaf 410) connected to the transmission part may be driven by the movement of the piston rod 507 to move for shaping a radiation field.

In some embodiments, the pneumatic actuator 500 may include a controller (e.g., one or more processors). The controller may control operations of components of the pneumatic actuator 500. For example, the controller may start the pneumatic actuator 500 in response to a control signal for driving the leaf 410 (e.g., a driving signal). As another example, the controller may shut off the pneumatic actuator 500 in response to a control signal for stopping the leaf 410 (e.g., a braking signal). In some embodiments, the controller may control operation parameters of the pneumatic actuator 500, such as the flow rate of the electromagnetic valve. In some embodiments, the controller may be located on the pneumatic actuator 500. In some embodiments, the controller may be physically separated from the pneumatic actuator 500.

Figure 6A:
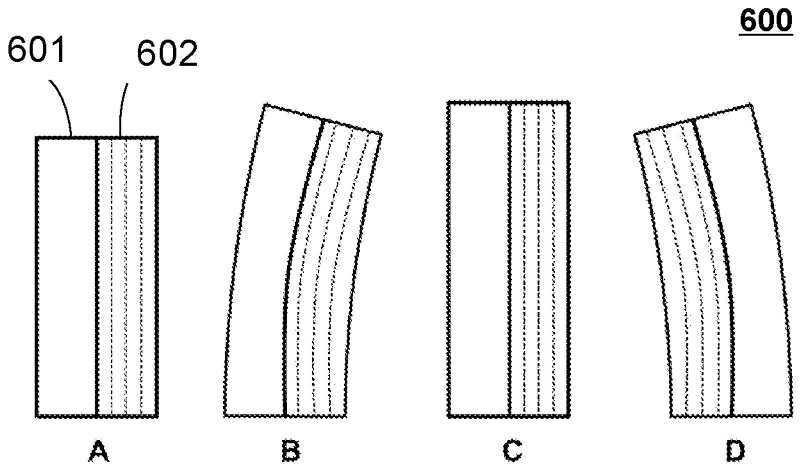
FIG. 6A is a schematic diagram illustrating exemplary deformation of a deformable part of a braking component of a multi-leaf collimator (MLC) according to some embodiments of the present disclosure.
Figure 6B:
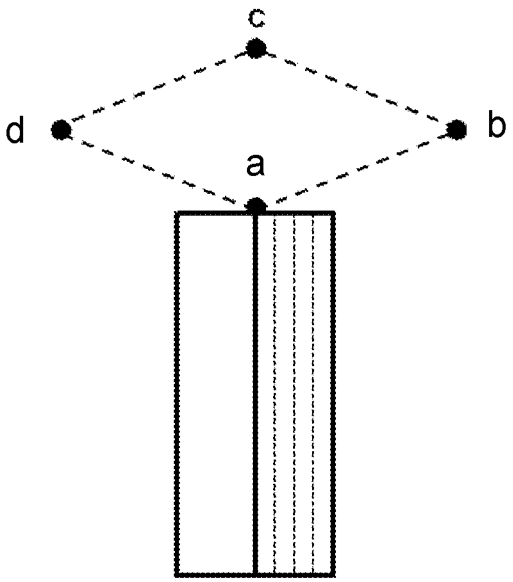
FIG. 6B is a schematic diagram illustrating exemplary deformation of a deformable part of a braking component of a multi-leaf collimator (MLC) according to some embodiments of the present disclosure.
Figure 6C:
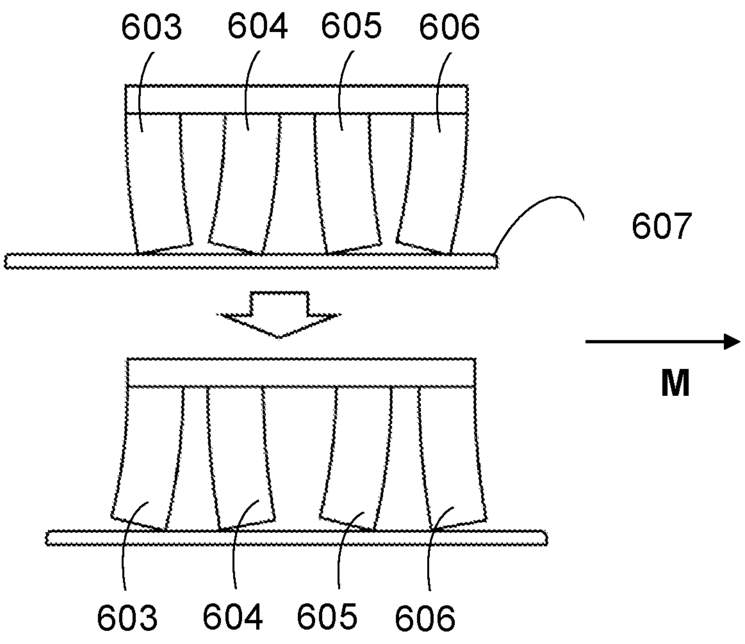
FIG. 6C is a schematic diagram illustrating an exemplary motion of a leaf driven by a braking component of a multi-leaf collimator (MLC) according to some embodiments of the present disclosure.

FIG. 6A is a schematic diagram illustrating exemplary deformation of a deformable part of a braking component of a multi-leaf collimator (MLC) according to some embodiments of the present disclosure. FIG. 6B is a schematic diagram illustrating exemplary deformation of a deformable part of a braking component of a multi-leaf collimator (MLC) according to some embodiments of the present disclosure. FIG. 6C is a schematic diagram illustrating an exemplary motion of a leaf driven by a braking component of a multi-leaf collimator (MLC) according to some embodiments of the present disclosure. It should be noted that the piezoelectric actuator 600 is merely provided as an exemplary driving component, and not intended to limit the scope of the present disclosure. The exemplary methods described in the present disclosure may be applied in other actuators, such as an electric-charge-based actuator, a magnetic actuator, a mechanical actuator, or the like.

The piezoelectric actuator 600 may include a control component, a power supply, one or more deformable parts, etc. Each of the one or more deformable parts may include a piezoelectric material that is deformed under electricity. Exemplary piezoelectric materials may include graphene, quartz, mica, porcelain, rubber, paper, polystyrene, or the like, or any combination thereof. The control component may be configured to control deformation of the each of the one or more deformable parts. In some embodiments, the control component may include a controller, a control circuit, etc. The controller may be configured to receive a control instruction and activate a corresponding control circuit. The control circuit may be configured to drive the one or more deformable parts to deform based on the control instruction. The power source may provide an electric field (or voltage) to the one or more deformable parts by inputting an electric signal (i.e., current) to the one or more deformable parts. The power supply may include a power source and a transducer. The transducer may be configured to adjust the frequency of the power source based on the control instruction.

In some embodiments, each of the one or more deformable parts may be caused to deform under an electric signal. For example, at least a portion of a deformable part may shrink or stretch under an electric signal. As a further example, when the deformable part is applied with a negative voltage, the deformable part may shrink; when the deformable part is applied with a positive voltage, the deformable part may stretch. If the electric signal is a direct current (i.e., DC) signal, at least a portion of the deformable part may shrink or stretch under the DC signal; if the electric signal is an altering current (i.e., AC) signal, at least a portion of the deformable part may shrink and stretch repeatedly under the AC signal, i.e., the at least a portion of the deformable part may vibrate under the AC signal. In some embodiments, different portions of the deformable part may be excited to deform separately. For example, the electric signal may be inputted into a target portion of the different portions of the deformable part, and the target portion of the deformable part may be excited to deform under the electric signal and other portions of the deformable part excluding the target portion may not deform. In some embodiments, different portions may be separated by an electrically insulating layer to prevent the transmission of the electrical signal in the different portions of the deformable part.

As shown in FIG. 6A, a deformable part may include a first portion 601 and a second portion 602. The first portion 601 and the second portion 602 may both have an end facing a leaf in an MLC when the piezoelectric actuator 600 is used for driving or stopping the leaf. In other words, the first portion 601 and the second portion 602 may be arranged along the movement direction of the leaf. It should be noted that the arrangement of the first portion 601 and the second portion 602 may be in other forms, such as along a direction perpendicular to the movement direction of the leaf or any other direction. It should be noted that a deformable part may include more than two portions arranged along the direction perpendicular to the movement direction of the leaf, or the direction parallel to the movement direction of the leaf, or any other direction.

The first portion 601 and the second portion 602 may be separated by an electrically insulating layer to prevent the transmission of the electrical signal in the first portion 601 and the second portion 602. After an electric signal is inputted into the deformable part including the first portion 601 and the second portion 602, the deformable part (i.e., both the first portion 601 and the second portion 602) may be caused to shrink (shown as state A) or stretch (shown as state C). The deformation may be in a range from 10 microns to 5 microns, or from 8 microns to 2 microns, etc. The deformation of the deformable part may be associated with a voltage magnitude corresponding to the current. For example, the greater the voltage magnitude is, the greater the deformation of the deformable part may be. If a DC signal is inputted into the first portion 601 and the second portion 602 of the deformable part, the deformable part may stretch toward a leaf in an MLC when the piezoelectric actuator 600 is used for stopping the leaf. When the deformable part contacts a leaf, the deformable part may provide a pressure force on the leaf. If the leaf is moving, a friction force (also referred to as the first force) may be generated between the leaf and the deformable part as the pressure force, and the friction force may cause the moving leaf to stop. The pressure and the friction force may be associated with the deformation of the deformable part. For example, the greater the deformation of the deformable part is, the greater the pressure and the friction force may be. If an electric signal is inputted into a portion of the deformable part, the deformable part may be caused to bend as the deformation of the portion of the deformable part. For example, if an electric signal is inputted into the first portion 601 of the deformable part, the first portion 601 of the deformable part may be caused to stretch, while the second portion 602 of the deformable part may not deform (shown as state B) or stretch slightly as the stretching of the first portion 601, or shrink (when an electric signal is inputted into the second portion 602 with an opposite direction with the electric signal inputted into the first portion 601), thereby causing the deformable part to bend toward the second portion 602. If an electric signal is inputted into the second portion 602 of the deformable part, the second portion 602 of the deformable part may be caused to stretch, while the first portion 601 of the deformable part may not deform (shown as state D) or stretch slightly as the stretching of the second portion 602, or shrink (when an electric signal is inputted into the first portion 601 with an opposite direction with the electric signal inputted into the second portion 602), thereby causing the deformable part to bend toward the first portion 601. If an AC electric signal is inputted into the second portion 602 or the first portion 601 of the deformable part, the deformable part may stretch and shrink repeatedly, thereby forming the vibration of the deformable part along a direction perpendicular to the direction of the deformation of the first portion 601 or the second portion 602 of the deformable part. When the deformable part contacts with a leaf in an MLC in the vibration, the deformable part may provide a friction force (also referred to as the second force) on the leaf that may cause the leaf to move in a direction of the friction force.

As shown in FIG. 6B, when the deformable part is not inputted an electric signal (i.e., state A in FIG. 6A), a middle point of an upper surface of the deformable part may be located at point a; when the first portion 601 of the deformable part is inputted an electric signal (i.e., state B in FIG. 6A), the middle point of an upper surface of the deformable part may be located at point b; when the deformable part is inputted an electric signal (i.e., state C in FIG. 6A), the middle point of an upper surface of the deformable part may be located at point c; and when the second portion 602 of the deformable part is inputted an electric signal (i.e., state D in FIG. 6A), the middle point of an upper surface of the deformable part may be located at point d. A friction force may be generated between the upper surface of the deformable part and a contact surface of the leaf. For example, under the action of the friction forces provided by the deformable parts 603-606, the leaf 607 may be caused to move along a direction denoted by arrow M as shown in FIG. 6C. When each of the deformable parts 603-606 is inputted into an AC, the deformable parts 603-606 may vibrate in the same frequency and direction to provide the friction forces with the same direction, which cause the leaf 607 to move in the direction of the friction forces. In some embodiments, the deformation of the deformable part may be determined based on the electric signal. For example, a first force may be generated by the braking component after a DC signal is inputted into one or more deformable parts. The first force may be configured to stop the leaf at an actual first position. As another example, a second force may be generated by the braking component after an AC is inputted into the one or more deformable parts. The second force may be configured to drive the leaf toward a desired target position from the actual first position with a second speed.

In some embodiments, a plurality of deformable parts may be arranged in a row. For example, the plurality of deformable parts may be arranged as shown in FIG. 6C. The plurality of deformable parts may be caused to drive the leaf synchronously. As the deformable part of the piezoelectric actuator 600 may deform rapidly under electricity, the response time of the piezoelectric actuator 600 may be short (e.g., less than 5 microns, or less than 3 microns). The piezoelectric actuator 600 may be used to stop a leaf rapidly. Therefore, a position of the leaf may be adjusted efficiently and accurately by the plurality of deformable parts in the piezoelectric actuator 600.

FIG. 7 is a schematic diagram illustrating exemplary hardware and/or software components of an exemplary computing device 700 on which the processing device 120 may be implemented according to some embodiments of the present disclosure. It should be noted that the description of the computing device 700 in FIG. 7 is intended to be illustrative, and not to limit the scope of the present disclosure.

As illustrated in FIG. 7, the computing device 700 may include one or more processors 716, storage 728, a bus 718, or the like, or any combination thereof. The one or more processors 716 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the one or more processors 716 may process data obtained from the radiotherapy device 110, the storage device 130, terminal(s) 140, and/or any other component of the radiotherapy system 100. In some embodiments, the one or more processors 716 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or combinations thereof.

Merely for illustration, only one processor is described in the computing device 700. However, it should be noted that the computing device 700 in the present disclosure may also include multiple processors, thus operations and/or method steps that are performed by one processor as described in the present disclosure may also be jointly or separately performed by the multiple processors. For example, if in the present disclosure the processor of the computing device 700 executes both operation A and operation B, it should be understood that operation A and operation B may also be performed by two or more different processors jointly or separately in the computing device 700 (e.g., a first processor executes operation A and a second processor executes operation B, or the first and second processors jointly execute operations A and B).

The bus 718 may be configured to connect other components in the computing device 700 (e.g., the one or more processors 716, the storage 728, etc.). The bus 718 may represent one or more bus structures. Exemplary bus structures may include a memory bus, a memory controller, a peripheral bus, a graphical acceleration port, a processor, or a local bus that uses any of several bus structures. For example, these bus structures may include, but not be limited to, an industry standards architecture (ISA) bus, a microchannel architecture (MAC) bus, an enhanced ISA bus, a video electronics standards association (VESA) local bus, a peripheral component interconnection (PCI) bus, etc.

The computing device 700 may include a plurality of computer readable medium. The plurality of computer readable medium may be any available medium that can be accessed by the computing device 700, including a volatile medium, a non-volatile medium, a removable medium, a non-removable medium, etc.

The storage 728 may store data/information obtained from the radiotherapy device 110, the storage device 130, the terminal(s) 140, and/or any other component of the radiotherapy system 100. The storage 728 may include a computer readable medium in the form of a volatile memory, such as a random access memory (RAM) 730 and/or a cache memory 732. The computing device 700 may further include other removable/non-removable, volatile/non-volatile computer storage medium. Merely by way of example, a storage device 734 may be used to read and write an immovable, non-volatile magnetic medium (not shown in FIG. 7, commonly referred to as a "solid-state drive"). Although not shown in FIG. 7, disk drives may be provided for reading and writing to removable non-volatile disks (e.g., "floppy disks") and to removable non-volatile disks (e.g., a compact disk ROM (CD-ROM), a digital video disk ROM (DVD-ROM), or other optical media). In these cases, each driver may be connected to the bus 718 through one or more data medium interfaces. The storage 728 may store one or more programs and/or instructions to perform exemplary methods described in the present disclosure. For example, the storage 728 may store a program for driving the leaves of the MLC.

The computing device 700 may include a program/utility 740 including at least one set of program modules 742. The program/utility 740 may be stored in, for example, the storage 728. Such a program module 742 may include, but not be limited to, an operating system, one or more applications, other program modules, program data, etc. Each or some combination of these embodiments may include an implementation of a network environment. The program module 742 may perform functions and/or methods described in the embodiments of the present disclosure.

The computing device 700 may communicate with one or more external devices 714 (e.g., a keyboard, a pointing device, a display 724, etc., wherein the display 724 may be configured as needed). The computing device 700 may communicate with one or more devices that enable a user to interact with the computing device 700, and/or with any device (e.g., a network card, a modem, etc.) that enables the computing device 700 to communicate with one or more other computing devices. The communication may be performed through an input/output (I/O) interface 722. In addition, the computing device 700 may also communicate with one or more networks (e.g., a local area network (LAN), a wide area network (WAN), and/or a public network, such as the Internet) through a network adapter 720. As shown in FIG. 7, the network adapter 720 may communicate with other modules of the computing device 700 through the bus 718. It should be noted that, although not shown in FIG. 7, other hardware and/or software modules may be used in accordance with the computing device 700. The hardware and/or software modules may include, but not be limited to, a microcode, a device driver, a redundant processing unit, a drive array of external disks, a redundant array of independent disks (RAID) system, a tape drive, a data backup storage device, or the like, or any combination thereof. It may be considered that those skilled in the art may also be familiar with such structures, programs, or general operations of this type of computing device.

The processor 716 may perform various functional applications and data processing by running the program stored in the storage 728. For example, the processor 716 may implement the method for driving one of a plurality of leaves in the MLC described in some embodiments of the present disclosure.

Figure 8:
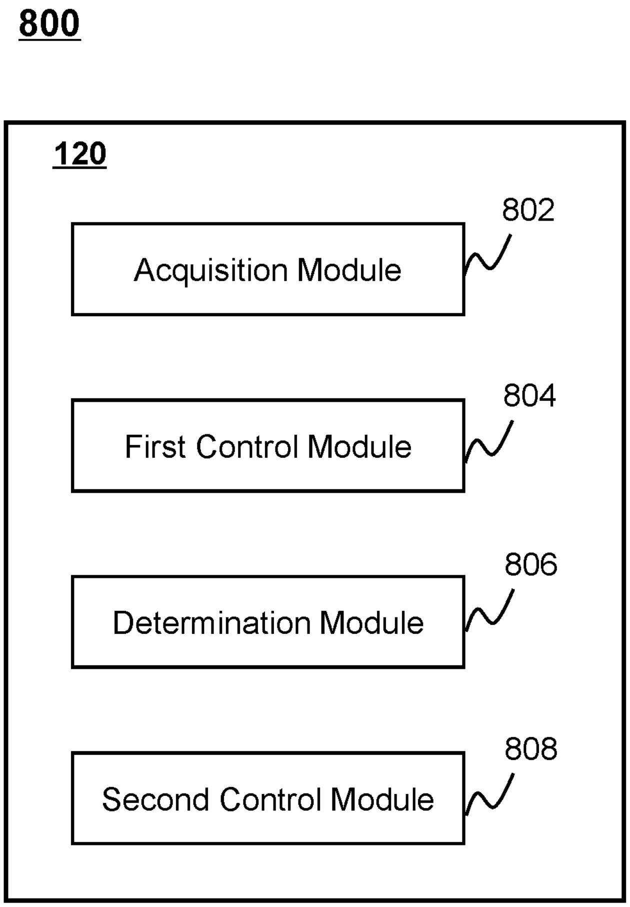
FIG. 8 is a block diagram illustrating an exemplary processing device according to some embodiments of the present disclosure.

FIG. 8 is a block diagram illustrating an exemplary processing device 120 according to some embodiments of the present disclosure. The processing device 120 may include an acquisition module 802, a first control module 804, a determination module 806, and a second control module 808. At least a portion of the processing device 120 may be implemented on a computing device as illustrated in FIG. 7.

The acquisition module 802 may be configured to obtain a desired first position of a leaf that the leaf is driven toward. The desired first position refers to a position that the leaf is driven toward by a driving component of a driving assembly. In some embodiments, the desired first position may be the same as a desired target position. In some embodiments, the desired target position may refer to a position of the leaf with which a radiation field is formed and the radiation field satisfies a condition. In some embodiments, the acquisition module 802 may determine (or prescribe) the desired target position and/or the desired first position of the leaf according to a treatment plan or a portion thereof.

The first control module 804 may be configured to cause a driving component of the driving assembly to drive the leaf toward the desired first position. The driving assembly may be configured to drive one of the plurality of leaves to the desired target position for shaping the radiation field. In some embodiments, the first control module 804 may generate a control signal (e.g., a driving signal) for causing the driving component of the driving assembly to drive the leaf toward the desired first position.

The determination module 806 may be configured to determine, based on measurement data associated with an actual position of the leaf acquired by position detection apparatus, whether the leaf arrives at the desired first position. The measurement data may include an actual position of the leaf, a displacement of the leaf, a current velocity of the leaf, etc. In some embodiments, the determination module 806 may determine, based on measurement data associated with the actual position of the leaf acquired by position detection apparatus, whether the leaf arrives at the desired first position. In some embodiments, the measurement data associated with the actual position of the leaf may be transmitted to the processing device 120 (e.g., the first control module 804, the second control module 808) in real time. The determination module 806 may determine whether the leaf arrives at the desired first position and generate a control signal. If the determination module 806 determines that the leaf arrives at the desired first position, the control signal may include a braking signal for stopping the leaf. If the determination module 806 determines that the leaf does not arrive at the desired first position, the control signal may include a driving signal for driving the leaf.

The second control module 808 may be configured to cause the braking component of the driving assembly to stop the leaf within a time period in response to a determination that the leaf arrives at the desired first position. In some embodiments, the second control module 808 may cause the braking component of the driving assembly to stop the leaf at an actual position during the moving of the leaf. In some embodiments, second control module 808 may cause the braking component to stop the leaf at the actual first position in response to receiving a braking signal for stopping the leaf at the desired first position. In some embodiments, after the braking component stops the leaf at the actual first position, the second control module 808 may cause the braking component to drive the leaf toward the desired target position. In some embodiments, the second control module 808 may cause the braking component to drive the leaf to move with a second speed by providing a second force on the leaf. In some embodiments, the second control module 808 may cause the braking component to stop the leaf at an actual target position in response to a determination that the leaf arrives at the desired target position.

In some embodiments, one or more modules are illustrated in FIG. 8 may be implemented in at least part of the radiotherapy system 100 as illustrated in FIG. 1. For example, the acquisition module 802, the first control module 804, the determination module 806, and the second control module 808 may be integrated into a console (not shown). Via the console, a user may set parameters for scanning a subject, controlling imaging or treatment processes, controlling parameters for the reconstruction of an image, etc. In some embodiments, the console may be implemented via the processing device 120 and/or the terminal(s) 140.

It should be noted that the above description of the processing device 120 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the first control module 804 and the second control module 808 may be integrated into one single unit.

Figure 9:
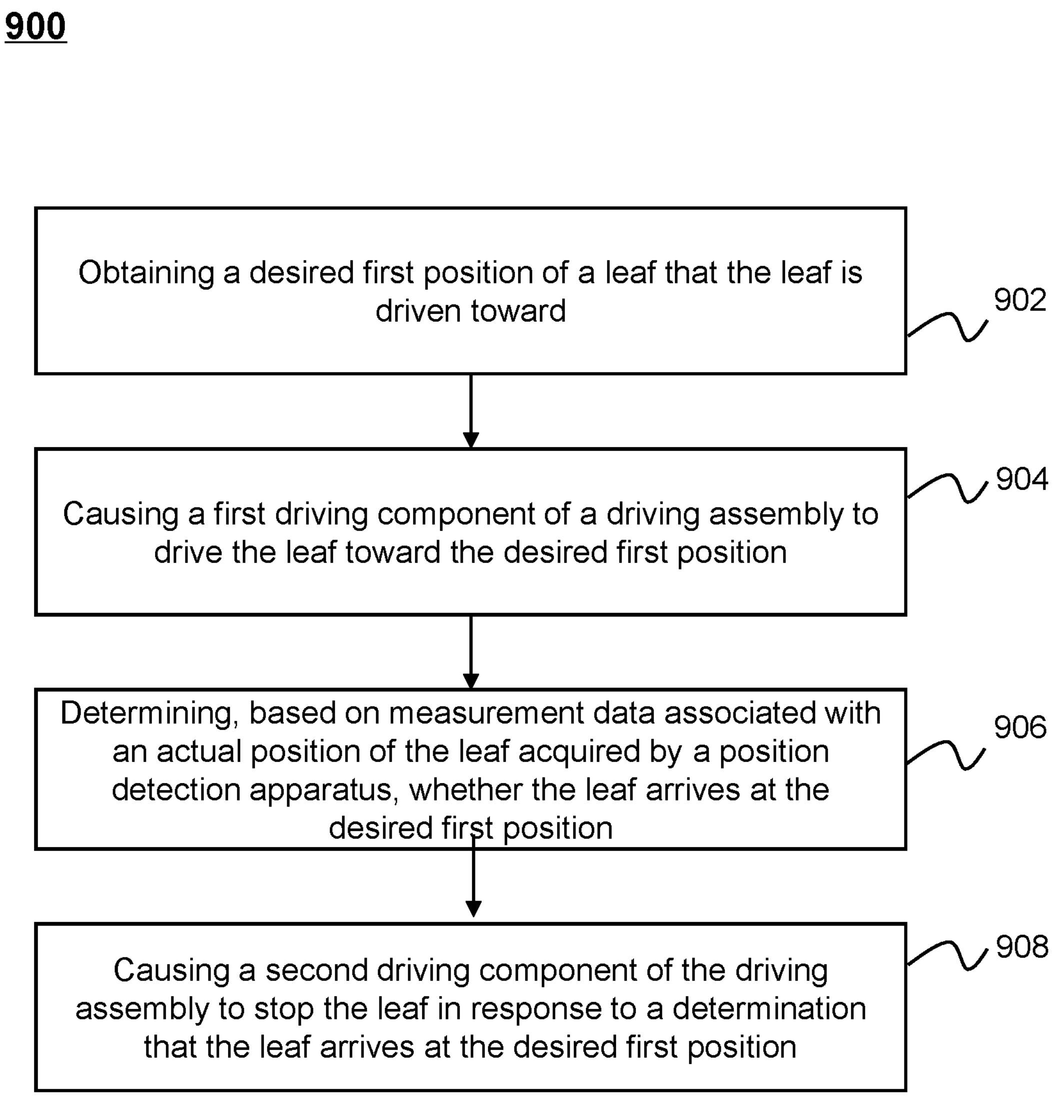
FIG. 9 is a flowchart illustrating an exemplary process for driving one of a plurality of leaves in a multi-leaf collimator (MLC) according to some embodiments of the present disclosure.

FIG. 9 is a flowchart illustrating an exemplary process for driving one of a plurality of leaves in a multi-leaf collimator (MLC) according to some embodiments of the present disclosure. In some embodiments, one or more operations of process 900 illustrated in FIG. 9 may be implemented in the radiotherapy system 100 illustrated in FIG. 1. For example, the process 900 may be stored in the storage device 130 and/or the storage 728 in the form of instructions (e.g., an application), and invoked and/or executed by the processing device 120 (e.g., the processor 716 of the computing device 700 as illustrated in FIG. 7). As another example, a portion of the process 900 may be implemented on the radiotherapy device 110. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 902, the processing device 120 (e.g., the acquisition module 802) may obtain a desired first position of a leaf that the leaf is driven toward.

The desired first position refers to a position that the leaf is driven toward by a driving component of a driving assembly. In some embodiments, the desired first position may be the same as a desired target position. In some embodiments, the desired target position may refer to a position of the leaf with which a radiation field is formed and the radiation field satisfies a condition. The radiation field satisfying a condition refers to that an area formed by the projected radiation beams may comply with the shape of the ROI (i.e., a treatment region) of a subject (e.g., tumor) to prevent healthy tissues around the ROI from being radiated when radiation beams pass through the radiation field and are projected to the ROI of the subject (e.g., tumor). In some embodiments, the desired target position may be a default setting of the system 100. In some embodiments, the desired first position may be different from the desired target position. In some embodiments, the desired first position may be any position between the desired target position and an initial position of the leaf before the leaf is driven to move. When two leaves in an MLC with opposite moving directions are driven simultaneously and the desired target positions of the two leaves are close, the two leaves of the MLC may have a risk of a collision. Therefore, a distance between the desired first position and the desired target position may avoid collisions between opposing leaf ends. The distance between the desired first position and the desired target position may be less than a distance threshold (also referred to as a fifth distance threshold), thereby the leaf may be adjusted from the desired first position to the desired target position. The fifth distance threshold may be determined according to parameters of the driving assembly (e.g., a first speed of the leaf driven by the driving component, a second speed of the leaf driven by the braking component, a first force on the leaf provided by a braking component of the driving assembly to stop the leaf at an actual first position). In some embodiments, the fifth distance threshold may be less than 5 millimeters. In some embodiments, the fifth distance threshold may be less than 4 millimeters. In some embodiments, the fifth distance threshold may be less than 3 millimeters. In some embodiments, the fifth distance threshold may be less than 2 millimeters. In some embodiments, the fifth distance threshold may be less than 1 millimeter.

In some embodiments, the desired target position and/or the desired first position of the leaf may be determined (or prescribed) according to a treatment plan or a portion thereof. In some embodiments, before a treatment process of an object starts, a treatment plan may be generated by a treatment planning system (TPS) associated with the radiotherapy system 100. In some embodiments, the treatment plan may include information associated with the treatment process including, for example, one or more radiation parameters, a treatment dose, or the like, or a combination thereof. The radiation parameters may include radiation beam properties (e.g., a beam shape of range, an aperture shape, an intensity, a radiation direction, or the like), positions and/or directions of an object to be treated, geometric properties of the MLC, or the like. In some embodiments, a treatment process may include one or more treatment fractions (or treatment sessions). In some embodiments, after the treatment plan is generated, a user may verify and/or adjust the treatment plan to avoid potential safety hazards and/or reduce the overall duration of a treatment process. The user may include a doctor, a radiation therapist, a dosimetrist, a radiation oncologist, a radiation specialist, or the like. In some embodiments, although the treatment plan may be determined before the treatment process, the desired target position and/or the desired first position of the leaf may be determined before the treatment process or during the treatment process. In some embodiments, the desired target position and/or the desired first position may be determined at one time point in the entire treatment process but before the leaf is moved in a corresponding treatment fraction. For example, after the treatment plan is generated and before the treatment process starts, the desired target position and/or the desired first position of the leaf in one or more treatment fractions may be already known according to the treatment plan, and then, the desired target position and/or the desired first position of the leaf in each of the one or more treatment fractions of the entire treatment process may be determined at one time. As another example, during the treatment process (e.g., before each treatment fraction), the desired target position and/or the desired first position of the leaf may be determined for an upcoming treatment fraction. In some embodiments, the desired first position may be determined based on the desired target position. For example, the desired first position may be with a distance (e.g., 2 millimeters, 1 millimeter) from the desired target position.

In 904, the processing device 120 (e.g., the first control module 804) may cause a driving component of the driving assembly to drive the leaf toward the desired first position.

The driving assembly may be configured to drive one of the plurality of leaves to the desired target position for shaping the radiation field. More descriptions regarding the driving component of the driving assembly may be found elsewhere in the present disclosure (e.g., FIGS. 2-4C and the descriptions thereof). In some embodiments, the processing device 120 may generate a control signal (e.g., a driving signal) for causing the driving component of the driving assembly to drive the leaf toward the desired first position. For example, if the driving component is a pneumatic actuator, movement parameters (e.g., a direction, a speed, a flow, etc.) of the pneumatic actuator may be determined based on a displacement between an initial position of the leaf and the desired first position. The control signal may be determined based on the movement parameters.

In some embodiments, the driving component may be configured to drive the leaf toward a desired position (e.g., the desired first position). In some embodiments, the driving component may be configured to drive the leaf toward the desired first position with a speed (also referred to as a first speed) exceeding a speed threshold. The speed threshold refers to the minimum speed of the driving component 420. In some embodiments, the speed threshold may exceed 100 millimeters per second. In some embodiments, the speed threshold may exceed 120 millimeters per second. In some embodiments, the speed threshold may exceed 150 millimeters per second. In some embodiments, the speed threshold may exceed 180 millimeters per second. In some embodiments, the speed threshold may exceed 200 millimeters per second. In some embodiments, the speed threshold may exceed 220 millimeters per second. In some embodiments, the speed threshold may exceed 250 millimeters per second. In some embodiments, the speed threshold may exceed 300 millimeters per second. In some embodiments, the speed threshold may exceed 400 millimeters per second.

In some embodiments, the driving component may include an actuator that is able to drive the leaf 410 to move with the first speed exceeding the speed threshold. More descriptions regarding the driving component may be found elsewhere in the present disclosure (e.g., FIGS. 2-4C and the descriptions thereof).

In 906, the processing device 120 (e.g., the determination module 806) may determine, based on measurement data associated with an actual position of the leaf acquired by position detection apparatus, whether the leaf arrives at the desired first position.

The measurement data may include an actual position of the leaf, a displacement of the leaf, a current velocity of the leaf, etc. In some embodiments, the measurement data may be acquired via a position detection apparatus. For example, the position detection apparatus may detect the actual position of the leaf directly. As another example, the position detection apparatus may detect a displacement of the leaf, and the actual position of the leaf may be determined based on the displacement of the leaf and an initial position of the leaf. The current velocity of the leaf may be determined based on the displacement of the leaf and a time for the movement of the leaf. More descriptions regarding the position detection apparatus may be found elsewhere in the present disclosure (e.g., FIG. 4A and the descriptions thereof).

In some embodiments, the processing device 120 may determine, based on measurement data associated with the actual position of the leaf acquired by position detection apparatus, whether the leaf arrives at the desired first position. For example, the processing device 120 may compare the actual position of the leaf and the desired first position. If a comparison result (i.e., a distance between the actual position of the leaf and the desired first position) is less than or equal to a distance threshold (also referred to as a second distance threshold), the processing device 120 may determine that the leaf arrives at the desired first position, and the processing device 120 may perform operation 908. If a comparison result (i.e., the distance between the actual position of the leaf and the desired first position) is larger than the second distance threshold, the processing device 120 may determine that the leaf does not arrive at the desired first position, and the processing device 120 may continue to perform operation 904. In some embodiments, the second distance threshold may be determined based on a minimum resolution of the position detection apparatus. The greater the minimum resolution of the position detection apparatus is, the greater than the second distance threshold. In some embodiments, the second distance threshold may be less than 1 millimeter. In some embodiments, the second distance threshold may be less than 0.5 millimeters. In some embodiments, the second distance threshold may be less than 0.3 millimeters. In some embodiments, the second distance threshold may be less than 100 microns. In some embodiments, the second distance threshold may be less than 50 microns. In some embodiments, the second distance threshold may be less than 30 microns. In some embodiments, the fourth distance threshold may be less than 10 microns.

In some embodiments, the measurement data associated with the actual position of the leaf may be transmitted to the processing device 120 (e.g., the first control module 804, the second control module 808) in real time. The processing device 120 may determine whether the leaf arrives at the desired first position and generate a control signal. If the processing device 120 determines that the leaf arrives at the desired first position, the control signal may include a braking signal for stopping the leaf. For example, the processing device 120 may send the braking signal to the braking component and the braking component may stop the leaf in response to receiving the braking signal. If the processing device 120 determines that the leaf does not arrive at the desired first position, the control signal may include a driving signal for driving the leaf. For example, if the processing device 120 determines that the leaf does not arrive at the desired first position, the processing device 120 may generate a driving signal and transmit the driving signal to the driving component. The driving component may cause the leaf to move to the desired first position in response to receiving the driving signal. As another example, if the processing device 120 determines that the actual first position is different from the desired first position, the processing device 120 may generate a driving signal to cause the braking component.

In 908, the processing device 120 (e.g., the second control module 808) may cause the braking component of the driving assembly to stop the leaf within a time period in response to a determination that the leaf arrives at the desired first position.

In some embodiments, the processing device 120 may cause the braking component of the driving assembly to stop the leaf at an actual position during the moving of the leaf. For example, the processing device 120 may cause the braking component to stop the leaf at an actual first position by providing a first force on the leaf in response to a determination that the leaf arrives at the desired first position. A distance (also referred to as a first distance) between the desired first position and the actual first position may be less than a distance threshold (also referred to as a first distance threshold).

The actual first position refers a position of the leaf where the leaf is stopped by the first force provided by the braking component. The first distance threshold refers to a maximum distance between the desired first position and the actual first position. In some embodiments, the first distance threshold may be less than 1 millimeter. In some embodiments, the first distance threshold may be less than 0.5 millimeters. In some embodiments, the first distance threshold may be less than 0.3 millimeters. In some embodiments, the first distance threshold may be less than 100 microns. In some embodiments, the first distance threshold may be less than 50 microns. In some embodiments, the first distance threshold may be less than 30 microns. In some embodiments, the first distance threshold may be less than 10 microns. In some embodiments, the first distance threshold may be less than 5 microns. In some embodiments, the first distance threshold may be less than 3 microns. In some embodiments, the first distance threshold may be less than 2 microns. In some embodiments, the first distance threshold may be less than 1 micron. Therefore, the braking component may immediately provide the first force on the leaf in response to the determination that the leaf arrives at the desired first position, such that the actual stopped position (e.g., the actual first position) of the leaf may be close to or the same as the desired position (e.g., the desired first position).

In some embodiments, the first force may be generated by the braking component after a direct current signal is inputted into the one or more deformable parts. For example, if the braking component is a piezoelectric actuator, after the DC signal is inputted into the one or more deformable parts, each of the one or more deformable parts may stretch toward a leaf in an MLC when the piezoelectric actuator is used for driving and stopping the leaf. When the deformable part contacts with a leaf, the deformable part may provide a pressure force on the leaf. If the leaf is moving, a friction force may be generated between the leaf and the deformable part as the pressure force, and the friction force may cause the moving leaf to stop. In some embodiments, the first force (e.g., the magnitude) may be determined and/or adjusted based on the voltage of the DC signal. The greater the voltage of the DC signal is, the greater the greater the pressure force on the leaf may be, and the greater the first force (i.e., the friction force) may be.

In some embodiments, the braking component may stop the leaf at the actual first position within the time period in response to receiving a braking signal for stopping the leaf at the desired first position. The time period from the time when the braking component receives the braking signal to the time when the braking component stops the moving of the leaf may also be referred to as a response time of the braking component. In some embodiments, the length of the response time of the braking component may be less than a time threshold, such that the actual stopped position (e.g., the actual first position) of the leaf may be close to or the same as the desired position (e.g., the desired first position) when the leaf is moving in a high speed (e.g., exceeding 200 millimeters per second). In some embodiments, the length of the response time of the braking component may be less than 1 millisecond. In some embodiments, the length of the response time of the braking component may be less than 500 microseconds. In some embodiments, the length of the response time of the braking component may be less than 100 microseconds. In some embodiments, the length of the response time of the braking component may be less than 50 microseconds. In some embodiments, the length of the response time of the braking component may be less than 10 microseconds. In some embodiments, the length of the response time of the second driving component may be less than 5 microseconds. In some embodiments, the length of the response time of the braking component may be related to the first speed of the leaf and/or the magnitude of the first force. In some embodiments, the smaller the first speed of the leaf is and/or the greater the magnitude of the first force is, the shorter the response time of the braking component may be.

In some embodiments, the first distance between the actual first position and the desired first position may be related to the magnitude of the first force and first speed of the leaf if the processing device 120 generates and transmits the braking signal to the braking component when the leaf arrives at the desired first position. The greater the first speed of the leaf is, the smaller the first force is (i.e., the smaller the voltage of the DC signal is), the greater the first distance may be.

In some embodiments, a moving distance of the leaf from a candidate position of the leaf when the braking component receives the braking signal to the actual stopped position of the leaf may be determined based on the magnitude of the first force and first speed of the leaf according to the conservation law of energy. If the actual stopped position (e.g., the actual first position) is the same as or close to the desired first position, the candidate position of the leaf when the braking component receives the braking signal may be determined based on the desired first position and the moving distance from the candidate position to the desired first position. The processing device 112 may generate the braking signal and transmit the braking signal to the braking component when the leaf arrives at the candidate position that is located before the desired first position, such that the actual first position may be the same as or close to the desired first position as much as possible.

In some embodiments, the braking signal may be generated by a controller in the driving assembly, the position detection apparatus, or any other controller that is independent from the driving assembly (e.g., the processing device 120, or the first control module 804, the determination module 806, the second control module 808, etc.) in response to the determination that the leaf arrives at the desired first position. In some embodiments, the braking signal may include the determination that the leaf arrives at the desired first position.

In some embodiments, if a distance between the desired first distance and the actual first position is greater than a distance threshold (also referred to as a third distance threshold), the processing device 120 may cause the braking component to drive the leaf toward the desired first position from the actual first position. The third distance threshold may be equal to 2 millimeters, 1 millimeter, 0.5 millimeters, 0.1 millimeters, 10 microns, etc. In some embodiments, the second distance threshold may be greater than the first distance threshold and/or the third distance threshold. In some embodiments, the second distance threshold may be less than the first distance threshold and/or the third distance threshold. In some embodiments, the second distance threshold may be equal to the first distance threshold and/or the third distance threshold. In some embodiments, the third distance threshold may be greater than the first distance threshold. In some embodiments, the third distance threshold may be less than the first distance threshold. In some embodiments, the third distance threshold may be equal to the first distance threshold.

In some embodiments, after the braking component stops the leaf at the actual first position, the processing device 120 may cause the braking component to drive the leaf toward the desired target position. In some embodiments, the processing device 120 may cause the braking component to drive the leaf to move with a second speed by providing a second force on the leaf. The second force may be generated by the braking component after an alternating current (AC)

is inputted into the one or more deformable parts. For example, after the AC is inputted into a first portion of a deformable part, the first portion of the deformable part may be caused to stretch, while a second portion of the deformable part may be still (as shown as state B in FIG. 6A), thereby causing the deformable part to bend toward the second portion. After the alternating current is inputted into a second portion of a deformable part, the second portion of the deformable part may be caused to stretch, while the first portion of the deformable part may be still (shown as state D in FIG. 6A), thereby causing the deformable part to bend toward the first portion. If an AC electric signal is inputted into the second portion or the first portion of the deformable part, the deformable part may bend repeatedly, thereby forming the vibration of the deformable part along a direction perpendicular to the direction of the deformation of the first portion or the second portion of the deformable part. When the deformable part contacts with a leaf in an MLC in the vibration, the deformable part may provide a friction force on the leaf that may cause the leaf to move in a direction parallel to the friction force. That is, the leaf may be driven toward the desired target position from the actual first position with the second speed by providing the second force on the leaf. In some embodiments, the second speed may be lower than the first speed. The driving component 420 may drive the leaf 410 with a high speed, such that the leaf 410 may arrive at the desired target position quickly, and the braking component 430 may drive the leaf 410 with a low speed, such that the actual target position of the leaf 410 may be controlled to be close to or the same as the desired target position, thereby improving the accuracy and efficiency of the positioning of the leaf 410. For example, the first speed may exceed 150 millimeters per second, while the second speed may exceed 10 millimeters per second.

In some embodiments, the processing device 120 may cause the braking component to stop the leaf at an actual target position in response to a determination that the leaf arrives at the desired target position. In some embodiments, the processing device 120 may determine, based on second measurement data associated with a second actual position of the leaf acquired by position detection apparatus, whether the leaf arrives at the desired target position. The second measurement data may include the second actual position of the leaf, a second displacement of the leaf, etc. In some embodiments, the second measurement data may be acquired via a position detection apparatus. For example, the position detection apparatus may detect the actual position of the leaf directly. As another example, the position detection apparatus may detect a displacement of the leaf, and the actual position of the leaf may be determined based on the displacement of the leaf and the actual first position of the leaf. More descriptions regarding the position detection apparatus may be found elsewhere in the present disclosure (e.g., FIG. 4A and the descriptions thereof). In some embodiments, the processing device 120 may further compare the actual position of the leaf and the desired target position to determine whether the leaf arrives at the desired target position. If a comparison result (e.g., a distance between the actual position and the desired target position) is less than or equal to a distance threshold (also referred to as the second distance threshold), the processing device 120 may determine that the leaf arrives at the desired target position, and the processing device 120 may stop the leaf at the actual target position by providing the third force on the leaf or removing the second force from the leaf. If a comparison result (e.g., a distance between the actual position and the desired target position) is larger than the second distance threshold, the processing device 120 may determine that the leaf does not arrive at the desired target position, and the processing device 120 may continue to drive the leaf toward the desired target position.

In some embodiments, a second distance between the desired target position and the actual target position may be less than a distance threshold (also referred to as a fourth distance threshold). The fourth distance threshold refers to a maximum distance between the desired target position and the actual target position. In some embodiments, the fourth distance threshold may be less than 1 millimeter. In some embodiments, the fourth distance threshold may be less than 0.5 millimeters. In some embodiments, the fourth distance threshold may be less than 0.3 millimeters. In some embodiments, the fourth distance threshold may be less than 100 micros. In some embodiments, the fourth distance threshold may be less than 50 microns. In some embodiments, the fourth distance threshold may be less than 30 microns. In some embodiments, the fourth distance threshold may be less than 10 microns. In some embodiments, the fourth distance threshold may be less than 5 microns. In some embodiments, the fourth distance threshold may be less than 3 microns. In some embodiments, the fourth distance threshold may be less than 2 microns. In some embodiments, the fourth distance threshold may be less than 1 micron. In some embodiments, the second distance between the desired target position and the actual target position may be less than the distance between the desired first position and the actual first position for the same braking component. The fourth distance threshold may be less than the first distance threshold. For example, the first distance threshold may be less than 1 millimeter, and the fourth distance threshold may be less than 0.5 millimeters. In some embodiments, the braking component may include an actuator with a sensitive response and an accurate distance control. More descriptions regarding the piezoelectric actuator may be found elsewhere in the present disclosure (e.g., FIGS. 4A-6 and the descriptions thereof).

In some embodiments, the measurement data associated with the actual position of the leaf may be transmitted to the processing device 120 (e.g., the first control module 804, the second control module 808) in real time. The processing device 120 may determine whether the leaf arrives at the desired target position, and generate a control signal. If the processing device 120 determines that the leaf arrives at the desired target position, the control signal may include a braking signal for stopping the leaf. For example, the processing device 120 may send the braking signal to the braking component and the braking component may stop the leaf in response to receiving the braking signal. If the processing device 120 determines that the leaf does not arrive at the desired target position, the control signal may include a driving signal for driving the leaf. For example, if the processing device 120 determines that the leaf does not arrive at the desired target position, the processing device 120 may generate a driving signal to cause the braking component to drive the leaf toward the desired target position.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, two or more leaves of the MLC may be moved according to the process 900 synchronously or alternately.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A multi-leaf collimator (MLC), comprising:
- a plurality of leaves configured to shape a radiation field; and
- a plurality of driving assemblies each of which is configured to drive one of the plurality of leaves to a desired target position for shaping the radiation field, wherein a driving assembly associated with a leaf includes:
- a driving component configured to drive the leaf toward a desired first position with a speed exceeding a speed threshold exceeding 100 millimeters per second; and
- a braking component configured to stop the leaf within a time period in response to a determination that the leaf arrives at the desired first position, the time period of the braking component for stopping the leaf is less than a time threshold.

2. The MLC of claim 1, wherein the speed threshold exceeds 200 millimeters per second.

3. The MLC of claim 1, wherein the time period of the braking component for stopping the leaf is less than 1 millisecond.

4. The MLC of claim 1, wherein the braking component is configured to stop the leaf at an actual first position, and a distance between the desired first position and the actual first position is less than a distance threshold, the distance threshold being less than 1 millimeter.

5. The MLC of claim 1, wherein the driving assembly further includes:
- a position detection apparatus configured to acquire measurement data associated with an actual position of the leaf, and
- whether the leaf arrives at the desired first position is determined based on the measurement data associated with the actual position of the leaf.

6. The MLC of claim 1, wherein the driving component includes a pneumatic actuator.

7. The MLC of claim 1, wherein the braking component includes one or more deformable parts, each of the one or more deformable parts including a piezoelectric material that is deformed under electricity.

8. The MLC of claim 7, wherein the braking component includes a piezoelectric actuator.

9. The MLC of claim 7, wherein the braking component is configured to provide a first force on the leaf to stop the leaf after a direct current signal is inputted into the one or more deformable parts.

10. The MLC of claim 9, wherein the braking component is further configured to drive the leaf to move by providing a second force on the leaf.

11. The MLC of claim 10, wherein the second force is generated by the braking component after an alternating current is inputted into the one or more deformable parts.

12. The MLC of claim 7, wherein
- the driving assembly further includes a first transmission part connected to the leaf and the driving component, a movement of the first transmission part driven by the driving component causing a movement of the leaf, and
- the braking component is configured to stop the movement of the first transmission part to stop the movement of the leaf.

13. The MLC of claim 12, wherein
- the braking component further includes a second transmission part sleeved on the first transmission part, and
- the second transmission part is configured to provide a force on the first transmission part to stop the movement of the first transmission part under the deformation of the one or more deformable parts.

14. The MLC of claim 12, wherein the one or more deformable parts are connected in series along a direction parallel to the movement direction of the leaf.

15. The MLC of claim 1, wherein the desired first position is the same as the desired target position or has a distance with the desired target position.

16. A method implemented on a computing device having at least one processor and at least one computer-readable storage medium for driving one of a plurality of leaves in a multi-leaf collimator (MLC) to shape a radiation field, each of the plurality of leaves being associated with a driving assembly configured to drive one of the plurality of leaves to a desired target position for shaping the radiation field, the method comprising:
- causing a driving component of the driving assembly to drive the leaf toward a desired first position with a speed exceeding a speed threshold exceeding 100 millimeters per second;
- determining, based on measurement data associated with an actual position of the leaf acquired by a position detection apparatus, whether the leaf arrives at the desired first position; and
- causing a braking component of the driving assembly to stop the leaf within a time period in response to a determination that the leaf arrives at the desired first position, wherein the time period of the braking component for stopping the leaf is less than a time threshold.

17. The method of claim 16, wherein the determining, based on measurement data associated with an actual position of the leaf acquired by a position detection apparatus, whether the leaf arrives at the desired first position includes:
- determining, based on the measurement data associated with the actual position of the leaf, a distance between the actual position and the desired first position; and
- determining that the leaf arrives at the desired first position in response to determining that the distance between the actual position and the desired first position is less than a second distance threshold or the leaf does not arrive at the desired first position in response to determining that the distance between the actual position and the desired first position exceeds the second distance threshold.

18. The method of claim 16, wherein the causing a braking component of the driving assembly to stop the leaf within a time period in response to a determination that the leaf arrives at the desired first position includes:
- generating a braking signal for stopping the leaf in response to the determination that the leaf arrives at the desired first position; and
- transmitting the braking signal to the braking component.

19. The method of claim 16, wherein the method further includes:
- determining a distance between an actual first position and the desired first position;

generating a driving signal for driving the leaf in response to a determination that the distance between the actual first position and the desired first position exceeds a third distance threshold; and transmitting the driving signal to the braking component.

20. A multi-leaf collimator (MLC), comprising:

a plurality of leaves configured to shape a radiation field; and a plurality of driving assemblies each of which is configured to drive one of the plurality of leaves to a desired target position for shaping the radiation field, wherein a driving assembly associated with a leaf includes:

a pneumatic actuator configured to drive the leaf toward a desired first position; and a piezoelectric actuator configured to stop the leaf at an actual first position in response to a determination that the leaf arrives at the desired first position, wherein the piezoelectric actuator includes a deformable part made of a piezoelectric material, and the deformable part contacts the leaf and provides a pressure and/or a friction on the leaf to drive the leaf to move and stop the leaf from moving; and drive the leaf toward the desired target position from the actual first position.

* * * * *